US012801793B2

(12) United States Patent
Wagner et al.

(10) Patent No.: US 12,801,793 B2
(45) Date of Patent: Nov. 17, 2026

(54) SECURE CRYPTOGRAPHIC COPROCESSOR

(71) Applicant: Google LLC, Mountain View, CA (US)

(72) Inventors: Philipp Wagner, Cambridge (GB); Gregory Andrew Chadwick, Cambridge (GB); Timothy Jay Chen, Pleasanton, CA (US); Michael Stefano Fritz Schaffner, Campbell, CA (US); Christopher Gori, San Francisco, CA (US); Rupert James Swarbrick, Cambridge (GB)

(73) Assignee: Google LLC, Mountain View, CA (US)

( * ) Notice: Subject to any disclaimer, the term of this patent is extended or adjusted under 35 U.S.C. 154(b) by 100 days.

(21) Appl. No.: 18/554,124

(22) PCT Filed: Apr. 5, 2022

(86) PCT No.: PCT/US2022/071557
§ 371 (c)(1),
(2) Date: Oct. 5, 2023

(87) PCT Pub. No.: WO2022/217229
PCT Pub. Date: Oct. 13, 2022

(65) Prior Publication Data

US 2024/0193309 A1 Jun. 13, 2024

Related U.S. Application Data

(60) Provisional application No. 63/171,554, filed on Apr. 6, 2021.

(51) Int. Cl.
*G06F 21/72* (2013.01)
*G06F 21/55* (2013.01)
(Continued)

(52) U.S. Cl.
CPC .............. *G06F 21/72* (2013.01); *G06F 21/55* (2013.01); *G06F 21/64* (2013.01); *H04L 9/0869* (2013.01);
(Continued)

(58) Field of Classification Search
CPC .......... G06F 21/72; G06F 21/55; G06F 21/64; G06F 2221/2143; G06F 7/58; H04L 9/0869; H04L 63/123
See application file for complete search history.

(56) References Cited

U.S. PATENT DOCUMENTS 6,971,020 B1 11/2005 Liardet et al.
7,168,065 B1 1/2007 Naccache et al.
(Continued)

FOREIGN PATENT DOCUMENTS

CN 101582109 A 11/2009
CN 102034040 A 4/2011
(Continued)

OTHER PUBLICATIONS

"Foreign Office Action", IN Application No. 202347059888, Apr. 2, 2025, 5 pages.
(Continued)

*Primary Examiner* — Cheng-Feng Huang
(74) *Attorney, Agent, or Firm* — Colby Nipper PLLC

(57) ABSTRACT

An apparatus with an integrated circuit (IC) chip can provide protection against attacks on a cryptographic coprocessor. An attacker can compromise a cryptographic coprocessor by, for instance, obtaining a private encryption key or instruction code. To combat these attacks, example implementations store information in encrypted form. The information may correspond to data, instruction code, or intermediate values located in state registers. To securely and quickly "erase" such stored information, the cryptographic
(Continued)

coprocessor can change the encryption key. In other example implementations, random numbers are provided with two different levels of "randomness quality" that is appropriate for different types of procedures. A cryptographic coprocessor can include two registers that store randomized bits in accordance with the two different quality levels for rapid access during cryptographic operations. To further thwart would-be attacks, a cryptographic coprocessor can verify the contents or usage of instruction code that is executed to perform cryptographic operations.

19 Claims, 16 Drawing Sheets

(51) Int. Cl.
*G06F 21/64* (2013.01)
*H04L 9/08* (2006.01)
*H04L 9/40* (2022.01)

(52) U.S. Cl.
CPC .... *H04L 63/123* (2013.01); *G06F 2221/2143* (2013.01)

(56) References Cited

U.S. PATENT DOCUMENTS

| | | | |
|---|---|---|---|
| 9,230,112 B1 | 1/2016 | Peterson et al. | |
| 10,333,708 B1 | 6/2019 | Diamant et al. | |
| 11,409,668 B2 | 8/2022 | Kim et al. | |
| 11,775,384 B2 | 10/2023 | Kanno | |
| 12,705,405 B2 | 8/2026 | Schaffner et al. | |
| 2002/0144236 A1 | 10/2002 | Beer et al. | |
| 2004/0181684 A1 | 9/2004 | Hong et al. | |
| 2008/0178010 A1 | 7/2008 | Vaterlaus et al. | |
| 2009/0196418 A1 | 8/2009 | Tkacik et al. | |
| 2010/0115184 A1 | 5/2010 | Chang | |
| 2010/0146624 A1 | 6/2010 | Meyer et al. | |
| 2012/0042376 A1 | 2/2012 | Dolgunov et al. | |
| 2012/0179898 A1 | 7/2012 | Betouin et al. | |
| 2012/0297111 A1 | 11/2012 | Hsu et al. | |
| 2013/0145177 A1 | 6/2013 | Cordella et al. | |
| 2013/0159791 A1 | 6/2013 | Fabrice et al. | |
| 2013/0268740 A1* | 10/2013 | Holt | G06F 21/00 711/163 |
| 2014/0173294 A1 | 6/2014 | Buer | |
| 2015/0006914 A1 | 1/2015 | Oshida | |
| 2015/0055778 A1 | 2/2015 | Cox et al. | |
| 2015/0134976 A1 | 5/2015 | Henry | |
| 2016/0232050 A1 | 8/2016 | Sonnekalb et al. | |
| 2018/0063100 A1 | 3/2018 | Peeters et al. | |
| 2018/0095985 A1 | 4/2018 | Zhang | |
| 2019/0007201 A1 | 1/2019 | Colombo et al. | |
| 2019/0042476 A1 | 2/2019 | Chhabra et al. | |
| 2019/0050602 A1 | 2/2019 | Sela et al. | |
| 2019/0095630 A1 | 3/2019 | Wang et al. | |
| 2020/0036509 A1 | 1/2020 | Seward, IV | |
| 2020/0184107 A1 | 6/2020 | Troia et al. | |
| 2020/0394337 A1 | 12/2020 | Marinet | |
| 2021/0182379 A1* | 6/2021 | Sanchez | H04L 63/123 |
| 2021/0232396 A1* | 7/2021 | Arsanto | G06F 9/3016 |
| 2021/0312055 A1 | 10/2021 | Kloth | |
| 2022/0058295 A1 | 2/2022 | Boehm et al. | |
| 2022/0066657 A1* | 3/2022 | Khayat | G06F 3/0659 |
| 2024/0184932 A1 | 6/2024 | Schaffner et al. | |
| 2024/0361923 A1 | 10/2024 | Swarbrick et al. | |
| 2025/0007948 A1 | 1/2025 | Sota et al. | |

FOREIGN PATENT DOCUMENTS

| | | |
|---|---|---|
| CN | 207424840 | 5/2018 |
| CN | 108199829 A | 6/2018 |
| CN | 109472172 | 3/2019 |
| CN | 110611561 A | 12/2019 |
| CN | 110659521 A | 1/2020 |
| CN | 111737013 | 10/2020 |
| CN | 112069551 A | 12/2020 |
| EP | 0114522 | 8/1984 |
| EP | 0908810 | 4/1999 |
| JP | S59188897 A | 10/1984 |
| JP | H03168831 A | 7/1991 |
| JP | H11191079 A | 7/1999 |
| JP | 2003108257 A | 4/2003 |
| JP | 2004054885 A | 2/2004 |
| JP | 2010021637 A | 1/2010 |
| JP | 2010258630 A | 11/2010 |
| JP | 2011010218 A | 1/2011 |
| JP | 2016126746 A | 7/2016 |
| JP | 2018088147 A | 6/2018 |
| JP | 2020524864 A | 8/2020 |
| TW | 200629068 | 8/2006 |
| TW | 201019337 A | 5/2010 |
| TW | 201203092 | 1/2012 |
| TW | 201638798 A | 11/2016 |
| TW | 201820132 | 6/2018 |
| TW | 202101224 A | 1/2021 |
| WO | 2006027308 A2 | 3/2006 |
| WO | 2015168211 | 11/2015 |
| WO | 2020076555 A1 | 4/2020 |
| WO | 2022213128 | 10/2022 |
| WO | 2022213129 | 10/2022 |
| WO | 2022217229 | 10/2022 |

OTHER PUBLICATIONS

"Foreign Office Action", IN Application No. 202347060234, Apr. 2, 2025, 6 pages.
"Foreign Office Action", JP Application No. 2024-529608, May 7, 2025, 4 pages.
"Non-Final Office Action", U.S. Appl. No. 18/553,488, filed Jun. 12, 2025, 22 pages.
"Non-Final Office Action", U.S. Appl. No. 18/553,476, filed Jul. 1, 2025, 9 pages.
"Foreign Office Action", TW Application No. 112140413, Nov. 8, 2023, 4 pages.
"International Preliminary Report on Patentability", Application No. PCT/US2022/071514, Oct. 3, 2023, 8 pages.
"International Preliminary Report on Patentability", Application No. PCT/US2022/071516, Oct. 3, 2023, 8 pages.
"International Preliminary Report on Patentability", Application No. PCT/US2022/071557, Oct. 10, 2023, 12 pages.
De Clercq, et al., "A survey of Hardware-based Control Flow Integrity (CFI)", Jul. 31, 2017, 27 pages.
De Clercq, et al., "SOFIA: Software and Control Flow Integrity Architecture", Apr. 28, 2016, 6 pages.
"Foreign Office Action", TW Application No. 111112862, Aug. 26, 2024, 36 pages.
"Foreign Office Action", JP Application No. 2023-557161, Oct. 22, 2024, 10 pages.
"Foreign Office Action", JP Application No. 2023-557214, Oct. 22, 2024, 13 pages.
"Foreign Office Action", JP Application No. 2023-557159, Nov. 12, 2024, 11 pages.
"Foreign Office Action", IN Application No. 202347060235, Dec. 11, 2024, 6 pages.
"Foreign Office Action", TW Application No. 111112851, Jan. 10, 2023, 12 pages.
"Foreign Office Action", TW Application No. 111112851, Jun. 20, 2023, 13 pages.
"International Search Report and Written Opinion", Application No. PCT/US2022/071514, Jul. 18, 2022, 12 pages.
"International Search Report and Written Opinion", Application No. PCT/US2022/071516, Jul. 19, 2022, 11 pages.
"International Search Report and Written Opinion", Application No. PCT/US2022/071557, Oct. 25, 2022, 18 pages.
"Invitation to Pay Additional Fees and Partial Search Report", Application No. PCT/US2022/071557, Aug. 5, 2022, 9 pages.

(56) References Cited

OTHER PUBLICATIONS

"International Preliminary Report on Patentability", Application No. PCT/US2022/071360, May 2, 2024, 8 pages.
"Foreign Office Action", TW Application No. 111112851, Jan. 12, 2024, 6 pages.
"Foreign Office Action", TW Application No. 111112851, Jul. 15, 2025, 18 pages.
"Foreign Office Action", IN Application No. 202447039928, Jul. 25, 2025, 7 pages.
"Foreign Office Action", JP Application No. 2024529608, Oct. 7, 2025, 4 pages.
"Final Office Action", U.S. Appl. No. 18/553,476, filed Jan. 23, 2026, 8 pages.
"Final Office Action", U.S. Appl. No. 18/553,488, filed Dec. 2, 2025, 19 pages.
"Foreign Office Action", KR Application No. 10-2024-7017716, Nov. 24, 2025, 10 pages.
"Non-Final Office Action", U.S. Appl. No. 18/711,527, filed Nov. 21, 2025, 9 pages.
"Final Office Action", U.S. Appl. No. 18/711,527, filed Mar. 4, 2026, 10 pages.
"Foreign Office Action", EP Application No. 22719187.1, Feb. 20, 2026, 7 pages.
"Foreign Office Action", EP Application No. 22718039.5, Mar. 13, 2026, 6 pages.
"Notice of Allowance", U.S. Appl. No. 18/553,476, filed Apr. 14, 2026, 8 pages.
"Foreign Office Action", KR Application No. 10-2023-7031202, May 4, 2026, 17 pages.
"Foreign Office Action", KR Application No. 10-2023-7031346, May 14, 2026, 17 pages.
"Notice of Allowance", U.S. Appl. No. 18/711,527, filed Jun. 5, 2026, 10 pages.
"Foreign Office Action", CN Application No. 202280021130.6, Jul. 23, 2026, 22 pages.
"Foreign Office Action", CN Application No. 202280021142.9, Jul. 24, 2026, 19 pages.

* cited by examiner

1300

SECURE CRYPTOGRAPHIC COPROCESSOR

RELATED APPLICATION(S)

This application is a national stage entry of International Application No. PCT/US2022/071557, filed Apr. 5, 2022, which claims the benefit of U.S. Provisional Application No. 63/171,554, filed Apr. 6, 2021, the disclosures of which are incorporated herein by reference in their entirety.

BACKGROUND

Electronic devices play integral roles in manufacturing, communication, transportation, healthcare, commerce, social interaction, and entertainment. For example, electronic devices power the server farms that provide cloud-based, distributed computing functionality for commerce and communication. Electronic devices are also embedded in many different types of modern equipment, from medical devices to appliances and from vehicles to industrial tools. Personal electronic devices enable portable video viewing and convenient access to smart digital assistants. Additionally, one versatile electronic device—the smartphone—has practically become a necessity to have within arm's reach. With electronic devices becoming pervasive and crucial to many aspects of modern life, device security has become imperative.

Many people are familiar with malware, which is sometimes referred to generically as a "computer virus." Some malware is designed to gain unauthorized access to information stored by an electronic device or to otherwise compromise the electronic device. Several strategies can help keep a user's devices and information safe from security threats by countering certain types of malware. These strategies include employing and regularly updating a resilient operating system, engaging in safe computing practices, and installing an antimalware program. Unfortunately, these strategies cannot make an electronic device invulnerable to all malware attacks.

Further, electronic devices can also be vulnerable to other types of attacks besides those carried out by software-based malware. For example, the safe and reliable operation of electronic devices, as well as the security of information stored by such devices, can be jeopardized by physical attacks on hardware and by radio-frequency attacks against wireless communications. In other words, some forms of attack can circumvent or undermine the strategies listed above to enable a bad actor to compromise an electronic device and potentially gain access to any accounts that are used with the device.

Electronic devices include at least one integrated circuit (IC) that provides the intelligence to enable various functionalities. These functionalities facilitate commerce, streamline healthcare access, provide entertainment, support social media interactions, and enable other services as identified above. An electronic device may also store or otherwise utilize information that is to be safeguarded. To support these functionalities and facilitate safe operation, some electronic devices include hardware-based protection in the form of security circuitry that is part of an IC. Unfortunately, existing approaches to security circuitry are inadequate to combat the varied software, hardware, and wireless attacks that are being unleashed on electronic devices today.

SUMMARY

Certain electronic devices, like server computers and smartphones, are responsible for providing services to users.

Users rely on these electronic devices to obtain critical services that are accessed using one or more accounts, like those for financial services, air travel, or official government documents. Because of the linkages between electronic devices and accounts, a compromised electronic device may permit undesired access to the services linked to an account or permit unauthorized access to the account itself. Further, to provide services that are associated with such accounts, these electronic devices may store account-related information that is to be safeguarded, such as financial data, usernames, passwords, and secret keys for encryption. Unfortunately, antimalware programs cannot block all avenues of attack against an electronic device. An antimalware program may not, for instance, provide protection against a direct physical attack that uses miniature probes to detect voltage levels on an integrated circuit (IC) chip. Consequently, it is beneficial to incorporate into an electronic device hardware-based measures that can identify, block, repel, or otherwise thwart attacks on the electronic device, including counteracting physical attacks.

An electronic device may therefore include security circuitry to counter attacks from bad actors. In some cases, the security circuitry detects inappropriate or suspicious activity and takes protective action. The security circuitry can be implemented in different manners. For example, computer engineers can fabricate security circuitry as a standalone IC chip or as part of another chip, such as a system-on-a-chip (SoC). In any case, the security circuitry can be part of a protected enclave, a trusted chip platform, a hardware-based root of trust (ROT) (e.g., silicon ROT), or a combination thereof. Regardless of how or where the security circuitry is incorporated into an electronic device, computer engineers may design security circuitry to counter many different types of attacks, as is described next.

Attacks on electronic devices can take the form of programs that observe screen images or monitor repetitive behavior to infer information, applications that attempt to read data from protected areas of memory, direct physical probing of circuitry, and so forth. Security circuitry performs multiple functions to combat one or more of these attacks. For example, security circuitry can protect encryption keys during use, while in transit, or in storage. To do so, dedicated memory and private data buses can be employed. Security circuitry can also generate high-quality pseudorandom numbers or operate a cryptographic engine in an area that is separate from applications that may operate as malware. Further, security circuitry may be designed to ensure that hardware is booted using the correct, untampered bootable basic input/output system (BIOS).

Security circuitry can therefore be responsible for implementing a diverse suite of functions to combat a wide variety of attacks on electronic devices. Existing approaches to security circuitry, however, employ hardware architectures that are designed on an ad hoc basis. Different circuit portions of the security circuitry may also be designed in relative isolation from one other. Consequently, circuit portions that are designed to combat various security threats may fail to interoperate as intended, leaving hardware less secure. Additionally, poor inter-component communication creates another avenue of attack for would-be bad actors. Further, this ad hoc approach makes the design and testing phases of security circuitry more arduous, lengthier, and more costly. This can lead to some security threats being ignored or inadequately addressed when the security architecture is developed. These ad hoc architectures therefore make protecting electronic devices from diverse and varied security threats more difficult.

This document, however, describes, in some examples, approaches that provide an adaptable and flexible framework or platform that can produce resilient and programmable security hardware to combat various forms of attacks on electronic devices. In some implementations for security circuitry, different types of circuits, or circuit portions that provide different security-related functionality, communicate using an expansive protocol that nonetheless produces certain and consistent signaling. The communication protocol enables circuits that provide different security-related functions to interact seamlessly in accordance with a specified design framework. The design framework and communication protocol produce "comportable components" such that even circuit components that are designed separately from one another are suitable to be consistently deployed together with stable, predictable interactions. As used herein, "comportable components" include those components that are designed to adhere to a common framework such that the components are suitable for use together. In some cases, comportability provides a degree of plug-and-play capability between two or more security-related components of an integrated circuit chip.

Security circuitry can include multiple peripheral devices in addition to a processor and an interconnect. Each peripheral device of multiple peripheral devices can perform some function that contributes to the safety or proper functioning of the security circuitry. Thus, each peripheral device can provide a core or supporting security-related function. The function, like controlling access to data or performing encryption operations, supports an overall purpose of the security circuitry. Such purposes may include providing features to enable secure computing by other circuitry and/or ICs of an electronic device. For the sake of predictability and interoperability, each peripheral device may be realized as a comportable component.

Generally, computing and other electronic devices are subject to attacks, including physical attacks, that can corrupt or steal data. A hardware root of trust (RoT) scheme can combat many attacks, including some physical ones. RoT silicon can be realized with an integrated circuit that provides security features. In some cases, a silicon ROT chip includes a cryptographic processor or coprocessor that is subject to physical attack by a bad actor who may attempt to read information, such as a cipher key or instruction code, or may attempt to undermine a cryptographic procedure. These physical attacks may be performed while the cryptographic coprocessor is "at rest" or while the cryptographic coprocessor is performing a cryptographic procedure.

A cryptographic coprocessor can, however, be designed or built to resist attacks. Moreover, a cryptographic processing block or module can be implemented as a comportable component—e.g., a cryptographic coprocessing peripheral device—of a security chip. Thus, a silicon RoT chip or other security circuitry can include a cryptographic processor (e.g., a coprocessor or accelerator) that operates as a block or module within a secure system. The processor can be used, for example, to provide asymmetric cryptography, such as message signing using Rivest-Shamir-Adleman (RSA) or Elliptic Curve Digital Signing Algorithm (ECDSA). In some implementations, the cryptographic processor can be realized with a general-purpose processor having "specialized" instructions and functional units for asymmetric cryptography. For example, functionality adapted for cryptographic operations can include a wide (e.g., 256-bit) register file, an arithmetic logic unit (ALU), and a multiply and accumulate (MAC) unit. These circuits can provide faster processing of wide integers that are used in some forms of asymmetric cryptography. The design of the cryptographic processor can be simplified to reduce the attack surface while still meeting performance targets. The cryptographic processor can also or instead be used for symmetric cryptographic operations.

To protect a cryptographic coprocessor in a silicon ROT chip or other security circuitry, the information stored at the cryptographic coprocessor can be encrypted. Encrypting information is one example of a more general term used here: "protecting the information from unauthorized access." Other examples of "protecting information from unauthorized access" include rendering encrypted information inaccessible by removing a cipher key, efficiently providing for cryptographic operations multiple bits that are randomized in accordance with two or more levels of randomization quality, and/or facilitating verification of executable code. The information may correspond to data, instruction code, intermediate values located in state registers, and so forth. This document describes techniques to securely and quickly "erase" such stored information by changing the encryption key. Some cryptographic procedures use one or more random numbers to perform cryptographic operations. This document describes techniques for providing random numbers that have two different levels of "randomness quality" (also called herein "quality of randomness") that is appropriate for different types of procedures. The randomness quality may be a numerical randomness value (e.g., an entropy value) which can be derived from a distribution of the random numbers. For a sequence of random numbers (including bits), the quality of randomness is indicative of the difficulty of predicting successive ones of the random numbers (including bits) given some or all of the earlier random numbers (including bits) of the sequence. Moreover, a cryptographic coprocessor can include two registers that store randomized bits in accordance with the two different randomness quality levels for rapid access during cryptographic operations. Additional example implementations for a secure cryptographic coprocessor pertain to verifying the contents or usage of instruction code that is executed to perform cryptographic operations. These and other described techniques can be implemented to make a cryptographic coprocessor more secure against attacks.

BRIEF DESCRIPTION OF THE DRAWINGS

Apparatuses of and techniques for a secure cryptographic coprocessor are described with reference to the following drawings. The same numbers are used throughout the drawings to reference like features and components.

FIG. 3-1 illustrates an example peripheral device including at least one interface to support comportability with other circuit components.

FIG. 3-2 illustrates an example approach to analyzing a peripheral device design to ensure comportable objectives are satisfied.

FIG. 3-3 illustrates an example peripheral device including a register interface and example communication signals.

DETAILED DESCRIPTION

Overview

Figure 1:
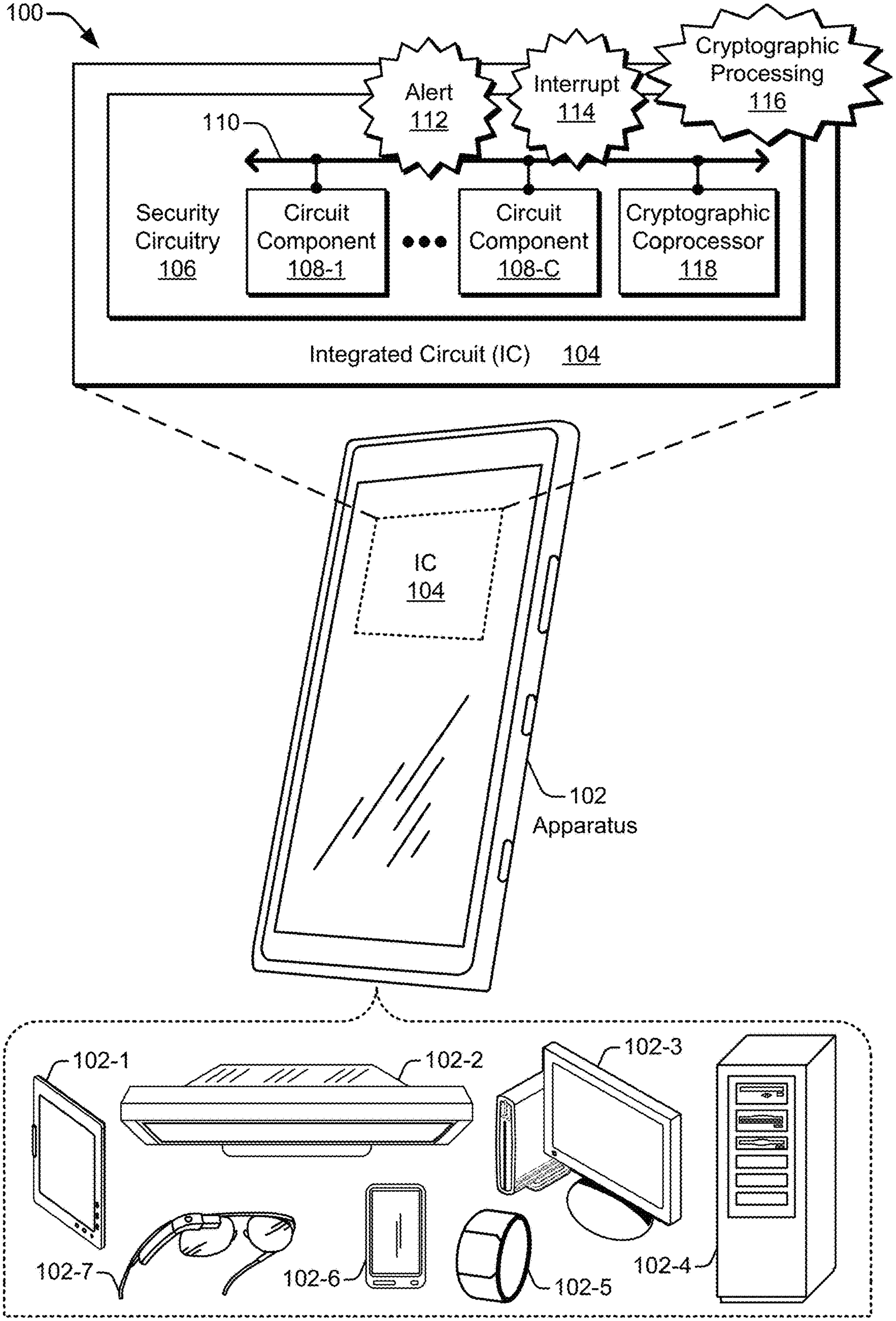
FIG. 1 illustrates an example apparatus with an integrated circuit (IC) that includes security circuitry in which a secure cryptographic coprocessor can be implemented.

Electronic devices make important contributions to modern society, such as those related to communication, safety, and manufacturing. Each electronic device relies on an integrated circuit (IC) that has processing capabilities to provide some functionality. With the critical nature of so many of these functionalities, an electronic device may include an IC with security circuitry to provide protection. The security circuitry reduces the chances that information is inadvertently exposed or that some function is used in a harmful or otherwise unauthorized manner. Security circuitry can be realized in a multitude of forms, one of which involves the root of trust (RoT) paradigm.

With RoT silicon, a hardware-based mechanism keeps computing safe in terms of preventing inappropriate access to information, deterring unauthorized use of a device, and so forth. Silicon ROT principles can help ensure that hardware infrastructure and the software that executes on it both remain in their intended, trustworthy state. To do so, the silicon RoT can verify that critical system components boot securely using authorized and verifiable code. Thus, it can ensure that a server or another electronic device boots with the correct firmware and that the firmware has not been infected by low-level malware. Silicon ROT can provide additional or alternative security benefits. For example, it can provide a cryptographically unique machine identity: this unique identity enables an operator to verify that an electronic device is legitimate. Further, it can maintain encryption keys and other information in a tamper-resistant silo, which prevents, or at least deters, even those with physical access to a device from obtaining the information. RoT services that are anchored in hardware can also offer authoritative, tamper-evident audit records and other runtime security services.

Chip designers can incorporate silicon ROT technology into individual IC chips that focus on providing security functions. Alternatively, ROT silicon can be integrated with other circuitry, including in a central processing unit (CPU) chip or package, in a graphics processing unit (GPU) chip or card, in a system-on-a-chip (SoC), in a memory storage device, and so forth. Generally, security circuitry can operate in server motherboards, network cards, client devices (e.g., laptops and smartphones), consumer routers, internet-of-things (IOT) devices, and fixed and portable storage units, just to name a few examples. By anchoring the RoT in silicon, computing security is enhanced across hardware, firmware, and software levels regardless of application or electronic device. Silicon ROT also enhances security across different devices that are in communication with each other directly or via a network. Although some security and circuit design principles are described in this document using a silicon or hardware ROT environment, this is done by way of example only, for the described principles are applicable to security circuitry generally.

In today's computing environment, bad actors can attack electronic devices at a myriad of levels using a multitude of attack vectors. For example, an attack can be made using malware that is transmitted over the internet to attempt to obtain information that is stored in a laptop but that a user wishes to be safeguarded. Also, an attack may involve injecting malware into firmware that is used to boot an electronic device, like a Wi-Fi® router or an IoT device, during transportation of the device or while the device operates in an unobserved location. As another example, a bad actor may steal an electronic device and have ample time to perpetrate direct physical attacks on the device. Such direct physical attacks can include severing wires, probing voltages, injecting faults with a laser, repeatedly running code to observe trends and infer information, and so forth.

Security circuitry can therefore be responsible for implementing a diverse suite of functions to combat a wide variety of attacks on electronic devices. Existing approaches to security circuitry, however, employ hardware architectures that are designed on an ad hoc basis. Different circuit portions of the security circuitry may also be designed in relative isolation from one other. Consequently, circuit portions that are designed to combat various security threats may fail to interoperate as intended, leaving hardware less secure. Additionally, poor inter-component communication creates another avenue of attack for would-be bad actors. Further, this ad hoc approach makes the design and testing phases of security circuitry more arduous, lengthier, and more costly. This can lead to some security threats being ignored or inadequately addressed when the security architecture is developed. These ad hoc architectures therefore make protecting electronic devices from diverse and varied security threats more difficult.

This document, however, describes approaches that provide an adaptable and flexible framework or platform that can produce resilient and programmable security hardware to combat various forms of attacks on electronic devices. In some implementations for security circuitry, different types of circuits, or circuit portions that provide different security-related functionality, communicate using an expansive protocol that nonetheless produces certain and consistent signaling. The communication protocol enables circuits that provide different security-related functions to interact seamlessly in accordance with a specified design framework.

The design framework and communication protocol produce "comportable" components such that even circuit components that are designed separately from one another are suitable to be consistently deployed together with stable, predictable interactions. For example, communications and other forms of interactions (e.g., the sharing of resources such as buses, interfaces, or memory) can be at least partially standardized to provide a measure of predictability and interoperability. As used herein, "comportable components" include those components that are designed to adhere to a common framework such that the components are suitable for use together. In some cases, comportability provides a degree of plug and play capability between two or more security-related components of an integrated circuit chip.

In some implementations, security circuitry includes multiple peripheral devices in addition to a "centralized" processor and an interconnect. Each peripheral device of multiple peripheral devices performs some function that contributes to the safety or proper functioning of the security circuitry. Thus, each peripheral device can provide a core security-related function or a supporting security-related function. The function, like controlling access to data or performing encryption operations, supports an overall purpose of the security circuitry, which includes providing features to enable secure computing by other circuitry and/or ICs of an electronic device. For the sake of predictability and interoperability, each peripheral device may be realized as a comportable component.

An example of a circuit component that can be implemented as a comportable component and/or as a peripheral device is a cryptographic processor (including a cryptographic coprocessor), block, or module. A cryptographic processor can be coupled to a system bus or interconnect and provide cryptographic functions, such as mathematical computations, for security circuitry, or another part of an integrated circuit. A cryptographic processor may be realized as a cryptographic coprocessor that supports or operates in conjunction with a "main," "central," or "host" processor. A cryptographic coprocessor can be used, for instance, for asymmetric cryptography (e.g., Rivest-Shamir-Adleman (RSA) cryptography and/or Elliptic Curve Digital Signature Algorithm (ECDSA) cryptography).

In some implementations, a cryptographic coprocessor can be hardened to detect or repel fault injection attacks. For example, the coprocessor can use a (39, 32) Hsiao error correction code (ECC) for integrity protection. The ECC may be used in error detection mode to the exclusion of correctability, such as to provide 3-bit error detection as opposed to 2-bit detection and 1-bit correction. Also, the coprocessor can use an inverted single-error correction and double-error detection (SEC-DED) Hsiao ECC code that selectively inverts certain bits to make the all-zeros word and the all-ones word not valid codewords. This enables detection of attacks that set all bits to zero or all bits to one. Further, the coprocessor can include data and/or instruction memory integrity protection that functions with, e.g., 32-bit and 256-bit reads and/or writes (or other bit widths).

In some cases, a memory integrity protection scheme that avoids recalculating integrity bits through one or more component transitions (e.g., as far as possible) can be implemented. For example, a coprocessor can include a fully integrity-protected path from a data memory to a register file. To do so, a transmission path (e.g., including wires and buffers) that propagates data between the data memory and the register file can include sufficient capacity (e.g., an adequate bit width) to transport data bits and the associated protection bits (e.g., ECC bits). Also, an integrity protection scheme, which consumes integrity-protected data (e.g., data+ECC bits), can be incorporated into the coprocessor. For example, the integrity protection scheme can extend from the system bus, through the data memory, and into the coprocessor's register file without reencoding the data. A combination of memory scrambling and ECC to diffuse injected faults can be applied to a memory of the cryptographic coprocessor. In other examples, decode and/or control logic can be duplicated. With such duplication, one copy can produce inverted versions of the generated outputs. Fault detection can be achieved by checking that the output of one matches the inversion of the output of the other. Further, instruction integrity from an instruction memory to functional units can be provided by combining the above (e.g., decode logic duplication) with the ECC bits for checking from the instruction memory. Thus, the ECC can protect a path to the decode units, and the duplicated decode units can protect the path to the functional units. For instance, a processor with a duplicated instruction decoder can provide resistance against fault injection attacks.

In other implementations, a cryptographic coprocessor can be hardened against side channel leakage using one or more techniques individually or in any combination. First, many, most, or even all instructions can have a data-independent timing, such as one cycle for each instruction. Generally, each particular instruction can take one, two, three, or more cycles, but the number of cycles to perform the particular instruction is the same each time the particular instruction is executed regardless of the target data. Second, most or even all state maintained within the processing block can be securely cleared with randomness. Third, information within the data and instruction memories (e.g., SRAM) can be cleared by changing at least one memory scrambling key. The key change can make all data or instruction code inaccessible within a single cycle and without leaking the data or instruction code. Fourth, area(s) from which information is to be cleared can be individually or separately selected.

These areas may include instruction memory, data memory, and most or even all internal state, which may be stored in registers. This changing of the scrambling key enables a fast and/or targeted protection of the information stored in different memories. If the instruction memory is preserved across invocations of the coprocessor, performance can be improved if executing the same cryptographic algorithm repeatedly (e.g., twice, or more) with different data. Manually triggering a data clear can entail enabling host software to read out the data first before clearing the data.

In additional or alternative implementations, a cryptographic coprocessor can provide software (e.g., the instruction code running the coprocessor and/or running on the coprocessor) with randomness of different qualities. Example randomness qualities may include a lower-quality randomness and a relatively higher-quality randomness. The relatively lower-quality randomness may be used, for example, for blinding/masking or to randomize a control flow in an application. The relatively higher-quality randomness may be used, for example, to meet Common Criteria certification requirements for cryptographic use cases because some public encryption algorithms have published standards. The random values generated in accordance with different qualities of randomness may be stored in separate registers and/or prefetched or otherwise predetermined so that the random bits are ready when they are to be used. Because random bits associated with a higher randomization quality may involve more energy or time to obtain, utilizing two different levels of randomness quality can enable a cryptographic coprocessor to balance power efficiency or execution speed versus an appropriate level of security, depending on the cryptographic operation.

A cryptographic coprocessor can provide other implementations with different and/or complementary security features. For example, the coprocessor can provide to a host processor a checksum that is computed over, e.g., all instruction code (or a designated portion of the instruction data) that has been or is being written to the instruction memory. This enables the host to verify the contents of the instruction code. The checksum can instead, or also, be computed over data stored in the data memory for a separate, or combined, ability to verify the contents of the data. Additionally or alternatively, a coprocessor can provide a quantity or number of executed instructions to a host processor for verification of the execution of the instruction code. In certain implementations, a cryptographic coprocessor that can perform asymmetric operations can also be used to perform symmetric operations (e.g., by implementing an algorithm such as a symmetric block cipher like AES-256 or by implementing an algorithm such as a secure hashing algorithm (SHA) like SHA2-512 or like HMAC-SHA-512, which is a keyed hashing algorithm).

In these manners, security circuitry can be incorporated into a silicon ROT chip and/or an SoC. Such security circuitry includes multiple peripheral devices, including a cryptographic coprocessor. Although some aspects of secure cryptographic processing and/or a secure cryptographic coprocessor are described in a security circuitry environment and/or in the context of comportable design, the disclosed secure cryptographic coprocessor concepts are applicable to other circuit environments and other design paradigms. Further, although some aspects of secure cryptographic processing and/or a secure cryptographic processor are described in terms of a coprocessor or a coprocessing environment, the disclosed secure cryptographic coprocessor and coprocessing concepts are applicable to a cryptographic processor and/or a cryptographic coprocessing environment generally.

This document describes a secure and/or hardened cryptographic coprocessor. However, this document first describes security environment examples with reference to FIGS. 1 and 2. Examples of peripheral device interfaces and design code analyses, including for “comportable components,” are described next with reference to FIGS. 3-1 to 3-3. This document then describes aspects and implementations for a secure cryptographic coprocessor with reference to FIGS. 4 to 8. An example electronic device is described with reference to FIG. 9. Each of the environments, aspects, circuitries, techniques and implementations described herein may be used individually or in any combination.

Thus, example implementations for a secure cryptographic coprocessor in various levels of detail are discussed below with reference to the associated figures. The discussion below first sets forth an example operating environment and then describes example hardware, schemes, and techniques. Example methods are described thereafter with reference to flow charts or diagrams. Finally, an example computing device is described.

Example Operating Environment for a Secure Cryptographic Coprocessor

FIG. 1 illustrates, at 100 generally, an example apparatus 102 with an integrated circuit 104 (IC 104) that includes security circuitry 106. The apparatus 102, the integrated circuit 104, and/or the security circuitry 106 can implement a secure cryptographic coprocessor 118 as described herein. In this example, the apparatus 102 is depicted as a smartphone. The apparatus 102 may, however, be implemented as any suitable computing or electronic device.

Examples of the apparatus 102 include a mobile electronic device or mobile device, mobile communication device, modem, cellular or mobile phone, mobile station, gaming device, navigation device, media or entertainment device (e.g., a media streamer or gaming controller), laptop computer, desktop computer, tablet computer, smart appliance, vehicle-based electronic system, wearable computing device (e.g., clothing, watch, or reality-altering glasses), Internet of Things (IoTs) device, sensor, stock management device, electronic portion of a machine or piece of equipment (e.g., vehicle or robot), memory storage device (e.g., a solid-state drive (SSD)), server computer or portion thereof (e.g., a server blade or rack or another part of a datacenter), and the like. Illustrated examples of the apparatus 102 include a tablet device 102-1, a smart television 102-2, a desktop computer 102-3, a server computer 102-4, a smartwatch 102-5, a smartphone (or document reader) 102-6, and intelligent glasses 102-7.

In example implementations, the apparatus 102 includes at least one integrated circuit 104. The integrated circuit 104 can be mounted on a module, card, or printed circuit board (PCB) (not shown). Examples of a PCB include a flexible PCB, a rigid PCB, a single or multi-layered PCB, a surface-mounted or through-hole PCB, combinations thereof, and so forth. Each integrated circuit 104 can be realized as a general-purpose processor, a system-on-a-chip (SoC), a security-oriented IC (e.g., a RoT IC chip), a memory chip, a communications IC (e.g., a modem or radio-frequency IC), a graphics processor, an artificial intelligence (AI) accelerator, combinations thereof, and so forth. The integrated circuit 104 can be packaged alone or together with other IC chips.

Figure 2:
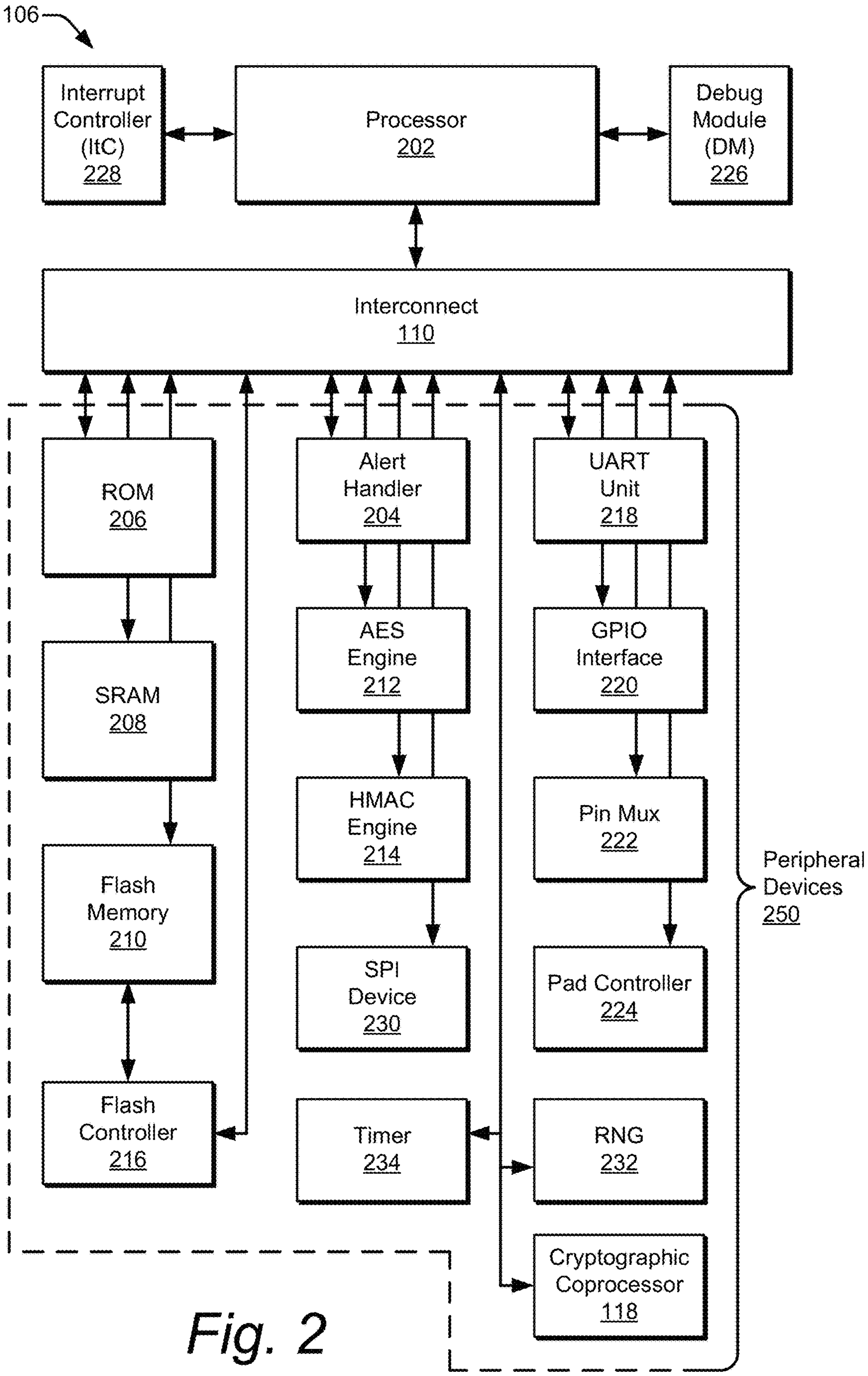
FIG. 2 illustrates example security circuitry that includes multiple circuit components, including multiple example peripheral devices that can be implemented to be comportable, such as a cryptographic coprocessing block.

As shown, the integrated circuit 104 includes security circuitry 106. The security circuitry 106 can include a variety of parts, including multiple circuit components 108-1 . . . 108-C, where (represents a positive integer, and an interconnect 110. Examples of circuit components 108, in addition to the interconnect 110, include a processor and multiple peripheral devices. These are depicted in FIG. 2 and described below. Although not explicitly shown in FIG. 1, the integrated circuit 104 may include other portions besides the security circuitry 106. While the multiple circuit components 108-1 . . . 108-C and the interconnect 110 may be integrated together on a single IC as shown, the components may alternatively be distributed across two or more ICs. The security circuitry 106 can be realized as, for example, a protected enclave, a trusted chip platform, a hardware-based root of trust (ROT) chip (e.g., a silicon ROT), and so forth. Regardless of how or where the security circuitry 106 is incorporated into an electronic device, the security circuitry 106 may counter many different types of attacks.

In example operations, once an attack—or a potential attack—or an anomalous occurrence is detected, an alert 112 or an interrupt 114 is generated by some component. For example, a circuit component 108 can generate an alert 112 and can transmit the alert 112 to an alert handler, which is described below. Additionally or alternatively, another circuit component 108 can generate an interrupt 114 for handling by the processor. The alert 112, the interrupt 114, and other signals are communicated between two or more components 108 in accordance with a common framework for interactions between the processor and/or peripheral devices of the security circuitry 106. The common framework can specify interfaces at each peripheral device and signaling to promote interoperability and use of consistent communication protocols across multiple peripheral devices. Thus, while some aspects of comportability are presented in terms of security circuitry, peripheral device comportability can also be employed with other types of circuitry. Example frameworks, as well as example communication interfaces and interface specifications, are described below with reference to FIGS. 3-1 to 3-3.

In some implementations, a circuit component 108 is realized as a cryptographic coprocessor 118 (or cryptographic coprocessing block 118). The cryptographic coprocessor 118 may be incorporated into the security circuitry 106 as a peripheral device, as a comportable component, a combination thereof, and so forth. The security circuitry 106, for instance, can utilize the cryptographic coprocessor 118 for fast and/or efficient cryptographic operations, including cryptographic-related mathematical computations, such as those with many digits. The cryptographic coprocessor 118 can, therefore, perform cryptographic processing 116. The operations and/or circuitry of the cryptographic processing 116 and the cryptographic coprocessor 118 can be secured against many forms of attacks, including physical ones, using the schemes and techniques described herein. These schemes and techniques include, for example, utilizing different qualities of randomness and wiping information by securely changing a scrambling key associated with the information. These and other aspects of a secure cryptographic coprocessor are described below with reference to FIGS. 4 to 8. With reference to FIG. 2, however, example architectures of the security circuitry 106 are described next.

FIG. 2 illustrates example security circuitry 106 that includes multiple circuit components, including multiple example peripheral devices 250 that can be implemented to be comportable. As shown, the security circuitry 106 includes a processor 202 that is coupled to an interconnect 110. The interconnect 110 can be realized using, for example, a bus, a switching fabric, or a bus network that enables the various circuit components to communicate. The multiple circuit components 108-1 . . . 108-C (of FIG. 1) can include, besides the interconnect 110 and/or the processor 202, multiple memories and multiple peripheral devices. Each of the processor 202, the multiple memories, and the multiple other peripheral devices 250 is directly or indirectly coupled to the interconnect 110. As depicted in FIG. 2 and described herein, a cryptographic coprocessor 118 may be implemented as a peripheral device 250 of security circuitry 106. A cryptographic coprocessor 118 may, however, be implemented in alternative environments.

In example implementations, the multiple memories can include a read-only memory 206 (ROM 206), a static random-access memory 208 (SRAM 208), and a flash memory 210. The multiple peripheral devices 250 can include an alert handler 204, an advanced encryption standard (AES) engine 212 (AES engine 212), a hash-based message authentication code (HMAC) engine 214 (HMAC engine 214), a serial peripheral interface (SPI) device 230 (SPI device 230), and a flash controller 216. The multiple peripheral devices 250 can also include a universal asynchronous receiver/transmitter (UART) unit 218 (UART unit 218), a general-purpose input/output (GPIO) interface 220 (GPIO interface 220), a pin multiplexer 222 (pin mux 222), and a pad controller 224. The multiple peripheral devices 250 can further include a random number generator 232 (RNG 232) and a timer 234. Additionally, the peripheral devices 250 can include any of the memories, as shown in FIG. 2. Although certain examples of memories and other peripheral devices 250 are depicted in FIG. 2 or described herein, a given implementation of the security circuitry 106 may include more, fewer, and/or different instances of processors, controllers, memories, modules, or peripheral devices, including duplicates thereof.

The illustrated circuit components can be operated synchronously based on one or more clock signals. Although not shown in FIG. 2, the security circuitry 106 may include at least one clock generator to generate the clock signals or may include reset circuitry to reset one or more individual components independently of each other, multiple components jointly, or an entire IC chip. Alternatively, the security circuitry 106 may receive at least one clock signal or a reset signal from a source that is external to the security circuitry 106, which source may or may not be on a separate chip. One or more separate peripheral devices 250 may operate in respective individual clock domains. For instance, input/output (I/O) peripheral devices may be synchronized to a clock that is local to a respective I/O device or channel. Peripheral devices in different clock domains may operate or communicate asynchronously with respect to one another.

Example implementations of the illustrated components are described below. The processor 202 may be realized as a "main," "central," or "core" processor for the security circuitry 106. The processor 202 may, by way of example only, be implemented with a 32-bit, in-order reduced instruction set computing (RISC) core with a multi-stage pipeline. With, e.g., a RISC-V functionality, the processor may implement an M (machine) and a U (user) mode. Activating a reset pin (not shown) (e.g., through de-assertion of an active-low reset pin) causes the processor 202 to exit reset and begin executing code at its reset vector. The reset vector may begin in the ROM 206, which validates code in the emulated embedded flash (e-flash) before jumping to it. In other words, the code is expected to have been instantiated into the e-flash before the reset is released. In some cases, resets throughout the security circuitry 106 can be made asynchronous active low as per a comportability specification to support interoperability among the various circuit components. A reset may be generated by the alert handler 204 as a security countermeasure: by a watchdog timer: and so forth. Reset signals may also be sent to other circuit components, such as one of the memories or one of the other peripheral devices 250.

Coupled to the processor 202 are a debug module 226 (DM 226) and an interrupt controller 228 (ItC 228), either of which may also be made comportable. The debug module 226 provides debug-access to the processor 202. By interfacing with certain pins of the IC, logic in the debug module 226 allows the processor 202 to enter a debug mode and provides an ability to inject code into the device (e.g., by emulating an instruction) or into a memory. The interrupt controller 228 may be disposed (e.g., positioned or located) proximate to the processor 202. The interrupt controller 228 can accept a vector of interrupt sources from within the security circuitry 106. The interrupt controller 228 can also assign leveling and priority to the interrupts before forwarding them to the processor 202 handling.

The processor 202 can provide any desired level of performance or include any internal circuit components. For example, the processor 202 can include at least one arithmetic logic unit (ALU) (e.g., including an "additional" ALU to calculate branch targets to remove a cycle of latency on taken conditional branches) and multiple pipeline stages. With multiple pipeline stages, a pipeline can perform register writeback to reduce a cycle of latency from loads and stores and prevent a pipeline stall where a response to a load or store is available the cycle after the request. The processor 202 can implement a single-cycle multiplier or produce an imprecise exception on an error response to a store, which allows the processor to continue executing past a store without waiting for the response. Although not depicted, the processor 202 specifically, or the security circuitry 106 generally, can include an instruction cache to provide single-cycle access times for instructions.

In the illustrated example, the security circuitry 106 includes three memory address spaces for instructions and data. The ROM 206 is the target for the processor 202 after release of a reset. The ROM 206 contains hard-coded instructions to perform a subset of platform checking before checking the next stage of code. The next stage of code—e.g., a boot loader stored in e-flash memory—can be the first piece of code that is not hard-coded into the silicon of the device. This next stage of code is, therefore, signature-checked for integrity to increase security. The ROM 206 can execute this signature check by implementing an Rivest-Shamir-Adleman (RSA)-check algorithm on the full contents of the boot loader.

The flash memory 210 can be implemented as e-flash memory for code storage. This e-flash can house the boot loader mentioned above, as well as an operating system and applications that layer on top. The SPI device 230 can be used to bulk-load the e-flash memory. The debug module 226 may also be used for code loading. The SRAM 208 can be operated as a scratch pad SRAM that is available for data storage by the processor 202 (e.g., for stack and heap information). The SRAM 208 can also store code.

The security circuitry 106 can include a suite of "peripherals" or "peripheral devices." These peripheral devices 250 may be subservient execution units that are coupled to the processor 202 via the interconnect 110. Each of these peripheral devices 250 can follow an interface framework that ensures comportability with each other and with the processor 202. A comportability scheme can specify how the processor 202 communicates with a given peripheral device (e.g., using the interconnect 110), how a peripheral device communicates with the chip I/O (e.g., via a fixed or multiplexable I/O), how a peripheral device communicates with the processor 202 (e.g., using interrupts), how a peripheral device communicates security events (e.g., using alert indications) to other circuit components, like the alert handler 204; how a peripheral device communicates with other peripheral devices (e.g., via at least one register, synchronously, or asynchronously): or combinations thereof. The depicted peripheral devices 250 can comprise peripheral devices relative to the alert-related functionality provided by the alert handler 204, relative to the processor 202, relative to one or more of the memories, relative to a chip I/O, and so forth. Thus, the memories can also comprise peripheral devices 250 relative to each other or the other depicted circuit components.

Circuit or chip I/O peripherals include the pin mux 222 and the pad controller 224. The pin mux 222 provides signaling routes between at least a portion of the peripheral devices 250 and available multiplexable I/O nodes of the security circuitry 106 (e.g., pins of the chip in which the various components are integrated or an interface to other portions of an SoC). The pad controller 224 manages control or pad attributes like drive strength, technology, pull up versus pull down, and the like of each of the circuits (e.g., the chip's) external I/O. The pin mux 222 and the pad controller 224 are themselves peripheral devices on the interconnect 110. Accordingly, each may have or may otherwise be associated with at least one collection of registers that provide software configurability.

The UART unit 218 can implement UART features, such as single-lane duplex UART functionality. The outputs and inputs thereof can be configured to connect to any circuit I/O via the pin mux 222. The GPIO interface 220 creates G bits of bidirectional communication to external circuitry via the pin mux 222, where G is a positive integer like 16, 32, or 64. Regarding memory I/O, the SPI device 230 can implement a firmware mode. Here, the firmware mode can enable a feature that provides the ability for external drivers to send firmware upgrade code into a bank of the flash memory 210 for in-field firmware updates. The firmware mode can include addressing of the memories using SPI transactions. Although not depicted, the security circuitry 106 can include an inter-integrated circuit (I2C) host to enable command of I2C devices. This command of I2C devices may include standard, full, and fast modes.

Several "core security" peripherals are also depicted, including the encryption engines and the alert handler 204. The AES engine 212 can provide symmetric encryption and decryption using one or more protocols and varying key sizes, like 128*b*, 192*b*, or 256*b*. The component can select encryption or decryption of data that arrives in, e.g., 16-byte quantities to be encrypted or decrypted using different block cipher modes of operation. The AES engine 212 can support electronic codebook (ECB) mode, cipher block chaining (CBC) mode, cipher feedback (CFB) mode, output feedback (OFB) mode, counter (CTR) mode, and the like. Data transfer can be made processor-available, e.g., key and data material may be passed into the cryptographic engine via register writes. Alternatively, private channels for the transfer of key and data material may be included to reduce exposure from potentially untrusted processor activity.

The HMAC engine 214 may utilize, for instance, a secure hash algorithm (SHA) SHA-256 as a hashing algorithm. SHA-256 is a member of the SHA-2 family of hashing algorithms in which the digest (or hash output) is of 256-bit length, regardless of the data size of the input to be hashed. The data is sent into the HMAC peripheral device after declaring the beginning of a hash request. This zeroes out the internal state to initial conditions, e.g., 32-bit at a time. Once the data has been sent by a component client, the client can indicate the completion of the hash request (with optional partial-word final write). In accordance with an example portability interface scheme, the HMAC engine 214 produces the hash result and makes it available for register read by the requesting client. The data transfer may be made processor-available or may be made private to reduce exposure to potentially untrusted processor activity.

HMAC is a message authentication protocol layered on top of a hashing function (e.g., SHA-256), and HMAC mixes in a secret key for cryptographic purposes. HMAC is a particular application of appending the secret key in a prescribed manner, such as twice, around the hashing (via SHA-256) of the message. To provide this functionality, a 256-bit key may be programmed into the circuit component before the message hash begins. The timing of authentication completion can vary and may be longer in latency than using native SHA-256. Here again, the hashing information or the secret key may be made processor-available for convenience or processing efficiency or may be rendered private in some manner for increased security.

The alert handler 204 is responsible for processing and responding to alerts, including ones provided from other peripheral devices 250. The alerts can be considered security-sensitive interrupts that are to be handled in a timely manner to respond to a perceived security threat. Unlike "standard" interrupts, alerts are not handled solely by software executing on the processor 202. Alerts can trigger a first-stage request to be handled by software as a "regular" interrupt. If, however, the software is not able to respond and properly remedy the alert-triggered interrupt, then the alert handler 204 triggers a second-stage response. The second-stage response can include enacting a security countermeasure, including terminating a process, erasing or otherwise deleting data, withdrawing power from a circuit portion, or resetting an IC chip or portion thereof. This ensures that the underlying issue—the perceived security threat—is addressed even if the processor 202 is busy, wedged, or also under attack.

Thus, an alert 112 (e.g., of FIG. 1) can be implemented as an elevated interrupt-type signal or alert indication that the alert handler 204 receives from other peripheral devices and that is indicative of a potential security threat. In operation, the alert handler 204 can gather alerts from other circuit components 108 of the security circuitry 106 and convert them into interrupts that the processor 202 can address. If the processor 202 does not clear the interrupt, however, the alert handler 204 provides hardware responses to address the potential security threat.

For some inter-device communications, the alert handler 204 receives differentially signaled synchronous or asynchronous alert indications from peripheral device sources. The peripheral devices 250 can generate alerts based on the functions, knowledge, or sensed parameters of the peripheral devices 250. For other inter-device communications, the alert handler 204 performs ping testing of the alert sources as a robust heartbeat mechanism. A ping monitor of the alert handler 204 (not explicitly shown) requests periodic alert responses from each alert source to ensure communication channels with the alert sources are functioning.

The alert handler 204 can also produce locally sourced hardware alerts based on communication failures. A first locally sourced alert is generated if differential signaling or another prescribed communication protocol with an alert source or an escalation handler fails (e.g., if a signal-integrity check fails). The alert handler 204 generates a second such alert if an alert source or an escalation handler fails to respond to a ping request. Generally, the alert handler 204 can receive incoming alerts from throughout the system, classify the alerts, issue interrupts based on the classified alerts, and escalate interrupts to hardware-based responses if the processor 202 does not clear an issued interrupt. The alert handler 204 can therefore act—e.g., as a stand-in for security responses—if the processor cannot or does not handle a security alert.

In some architectures, a security alert is intended to be a rare event, at least relative to "standard" interrupts. Accordingly, at a design stage, a possible event may be designated as an alert event to the extent the event is expected to not happen frequently and if the event has potential security consequences. Examples of such events are parity errors (which might indicate an attack), unauthorized actions on cryptographic or security-related components, sensed values from physical sensors indicating environmental modification (e.g., voltage or temperature), and so forth. The system routes alerts through the alert handler 204, which converts the alerts to interrupts for the processor 202 to potentially address. An underlying expectation, for some implementations, is that a secure operating system has a protocol for handling in software any such interrupt that arises due to an alert. If so, the secure operating system can usually resolve the interrupt and then clear the interrupt with the alert handler 204. Each peripheral device 250 can present a list of individual alerts that represent respective potential threats to be handled. Peripheral devices can transmit an alert as an alert indication to the alert handler 204 using a particular encoding mechanism.

The security circuitry 106 can also include the RNG 232. Generally, randomness can contribute to the security functionality by providing variations in execution that can keep attackers from predicting a good time to launch an attack. A random number, for instance, can provide secret material used for identity and cryptographic purposes. The RNG 232 can be seeded into algorithmic computation to obscure sensitive data values. Generally, the RNG 232 provides better performance as its number generation increasingly becomes truly random and to the extent it can also be hardened against attack. The RNG 232 may be implemented as a "true" RNG (TRNG), which may involve a design having an analog portion to take advantage of some physical event or process that is non-deterministic. Example TRNG designs rely on metastability, electronic noise, timing variations, thermal noise, quantum variation, and so forth. The TRNG filters the resulting variable(s) and sends them into a pool of entropy that the device can sample at a given time for a current randomized function. In some cases, an interface to the entropy pool can include a read request of available random bits. The TRNG interface indicates how many bits are available, and the requesting peripheral device or software can read from this pool to the extent bits are available. Attempted reading of entropy bits that are not available can trigger an interrupt or an alert.

Two other peripheral devices 250 include the timer 234 and the flash controller 216, the latter of which is described in the following paragraph. The timer 234 can, for example, support accurate performance by the processor 202. The timer 234 is formed from multiple bits (e.g., 64 bits) and operates as a free-running timer with a guaranteed frequency to within some percentage. Another timer (not explicitly shown) can act as a watchdog timer to backstop the processor 202 in case the processor becomes unresponsive. The unresponsiveness may be due to development code that is wedged, a security attack, and so forth.

The flash controller 216 controls the flash memory 210, which is available for code and data storage. The primary read path for this data can be in the standard memory address space. Writes to that address space can be ignored, however, because flash is not written to in a standard way. Instead, to write to the flash memory 210, software interacts with the flash controller 216. The flash functionality can include three primary commands: read, erase, and program. Read commands can be standardized and can use the chip memory address space. Erase commands are performed at a page level, where the page size is parameterizable by the flash controller 216. Upon receiving an erase request, the flash controller 216 wipes the contents of the target page, which renders the data into a "1" state (e.g., 0xFFFFFFFF per word). Afterward, software can program individual words to any value. A flash bit is not returned to a "1" state without another erase, so future content is effectively changed with an AND of the current content and the written value. Erase and program commands are relatively slow: A typical erase time is measured in milliseconds, and program times are in the range of microseconds. Security is also a concern because secret data may be stored in the flash memory 210. Some memory protection can therefore be provided by the flash controller 216.

The security circuitry 106 is depicted in FIG. 2 with a particular set of circuit components. A given security circuitry 106 can, however, have more, fewer, or different circuit components. The circuit components may also be interconnected differently or operate in manners besides those example manners described above. Further, some circuit components may be omitted while other circuit components are implemented in multiple instances. For example, the alert handler 204 may be duplicated or distributed, or multiple AES encryption engines 212 may be present in some security circuitry 106. Further, a GPIO interface 220 may be omitted from among the peripheral devices 250 of security circuitry 106 for IC chips in which the security circuitry 106 forms but one core among dozens.

Example Schemes, Techniques, and Hardware of a Comportable Paradigm for a Secure Cryptographic Coprocessing Peripheral Device The security circuitry 106 (e.g., of FIGS. 1 and 2) can include comportable circuit components, including the peripheral devices 250, such as a cryptographic coprocessor 118. This section describes example approaches to making peripheral devices comportable. Each peripheral device 250 can adhere to comportability specifications for the security circuitry 106. By adhering to a comportability specification that defines at least one interface scheme or communication protocol, a peripheral device 250 is realized with at least one interface that produces consistent and expected interactions between the peripheral device 250 and other peripheral devices. This produces increased communication predictability and certainty and decreases the time involved to design and test security circuitry.

Figures 1, 3:
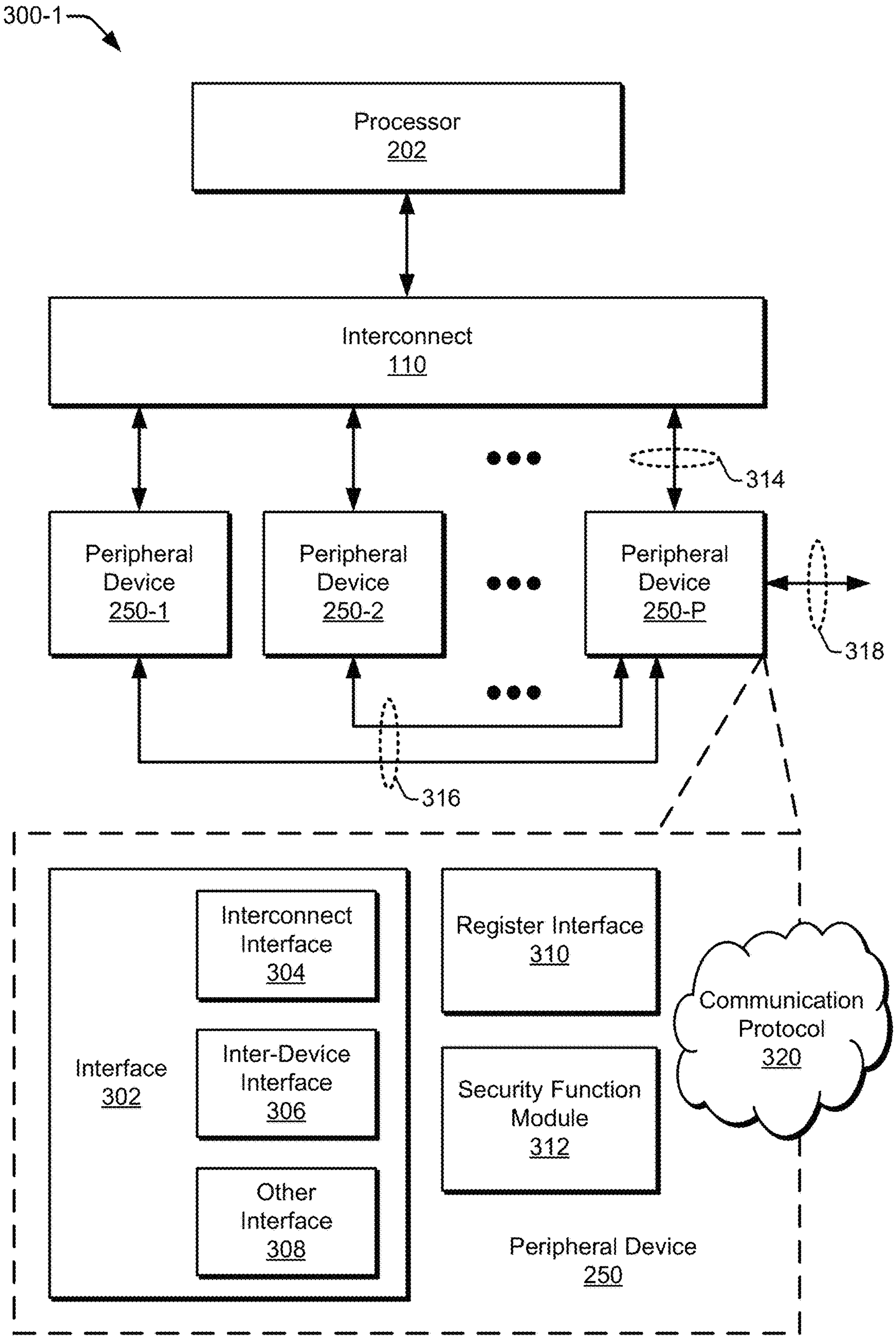
Figures 2, 3:
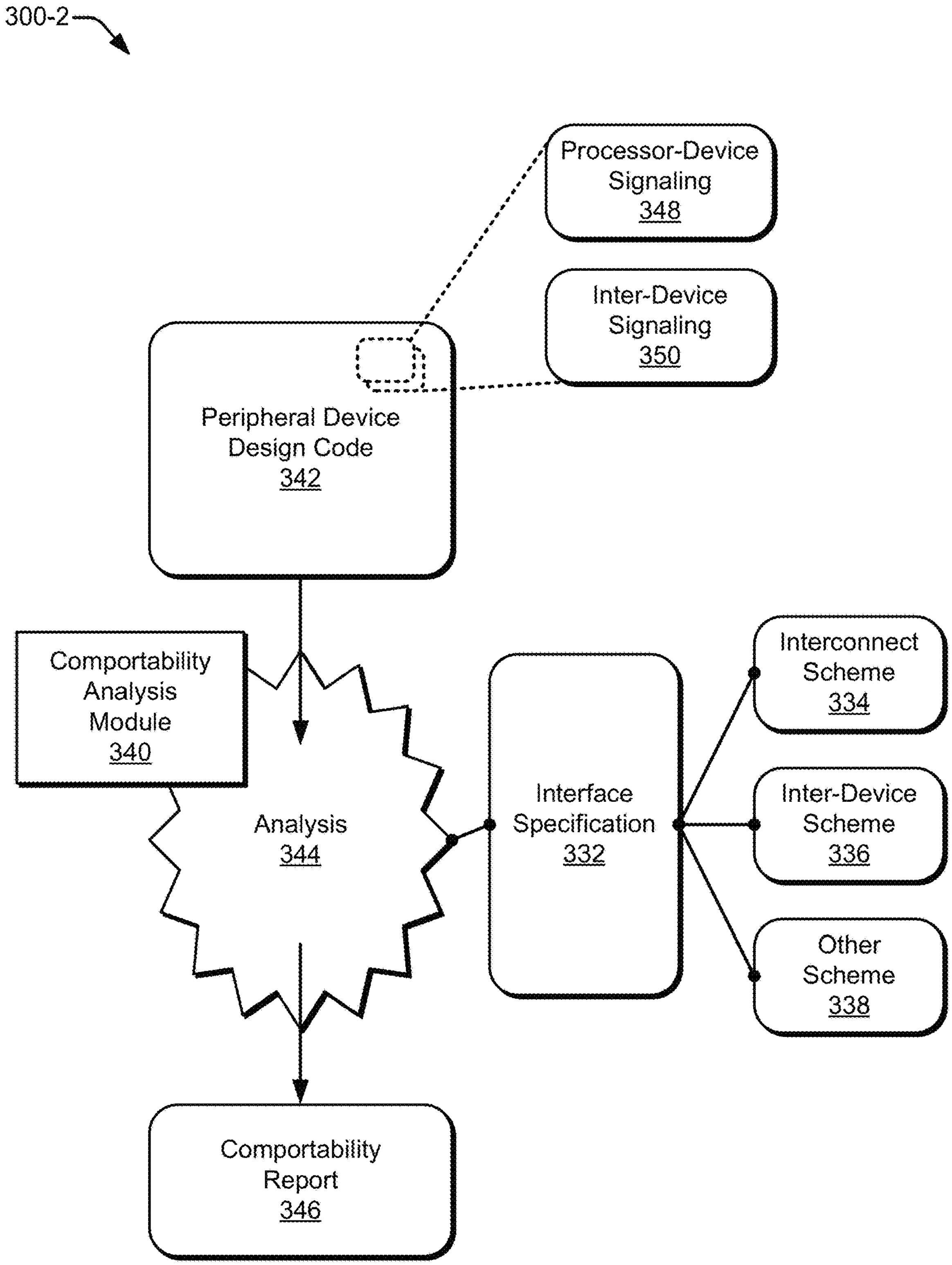
Figure 3:
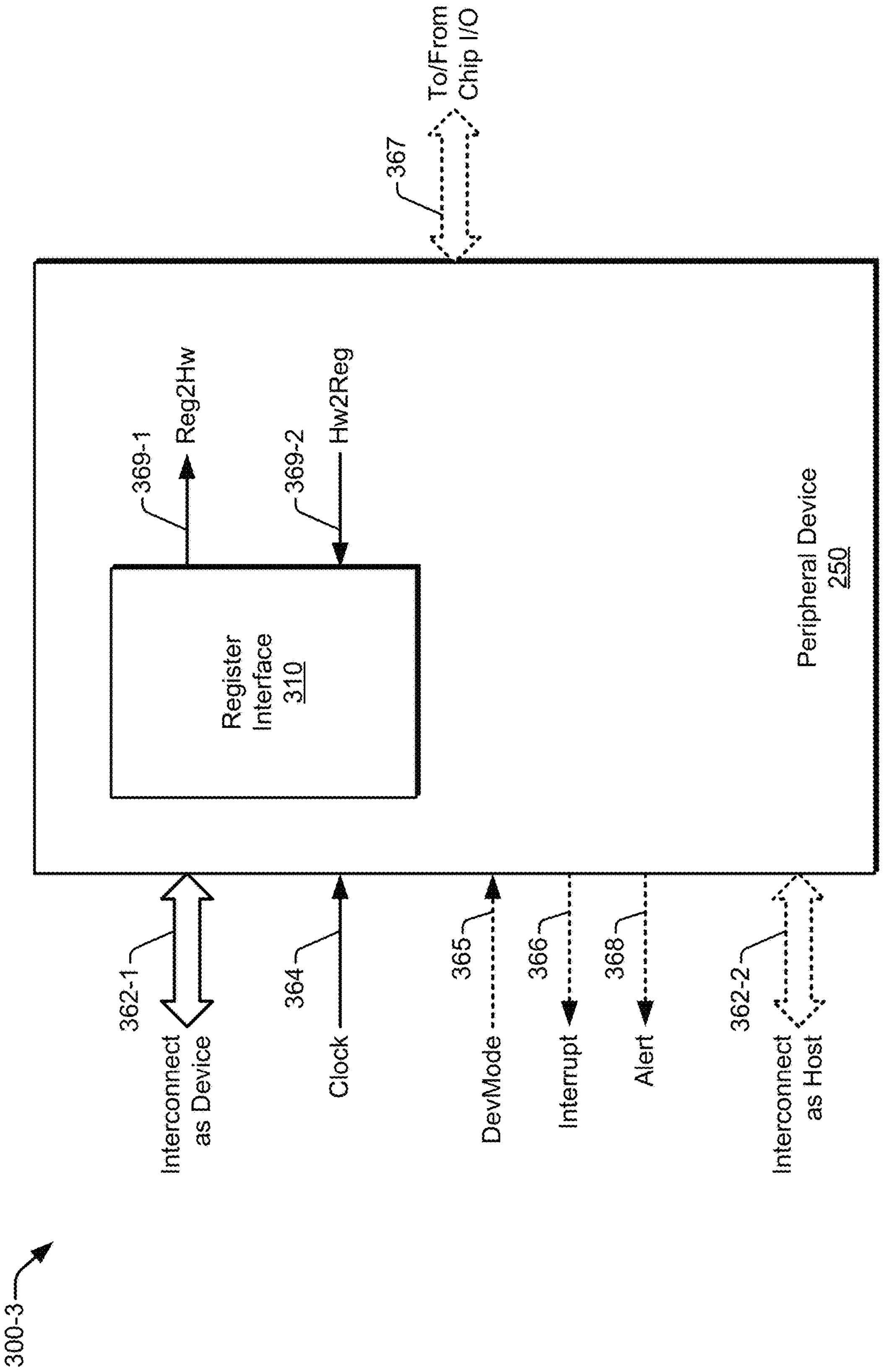

FIG. 3-1 illustrates at 300-1 an example peripheral device 250 including at least one interface 302 to support comportability with other circuit components. More generally, FIG. 3-1 includes an interconnect 110, a processor 202 coupled to the interconnect 110, and multiple peripheral devices coupled to the interconnect 110. Thus, the multiple peripheral devices can at least be coupled to the processor 202 via the interconnect 110. Each peripheral device 250 may, however, also be coupled to the processor 202 directly or otherwise without using the interconnect 110, such as via a mechanism comparable to an interface 302, a register interface 310, or at least one inter-device communication 316, which are described below. FIG. 3-1 explicitly depicts P peripheral devices 250-1, 250-2, . . . , 250-P, with P representing a positive integer.

In example implementations, each peripheral device 250 includes at least one interface 302 that enables the peripheral device 250 to adhere to a communication framework that provides certainty for interoperating peripheral devices. For example, the interface 302, or communication interface 302, can enable the peripheral device 250 to implement at least one communication protocol 320. The interface 302 includes at least one interconnect interface 304, at least one inter-device interface 306, and at least one other interface 308. These interfaces are described below: As shown, the peripheral device 250 also typically includes at least one register interface 310 and at least one security function module 312. Generally, the interface 302 enables the peripheral device 250 to adhere to a common framework for interacting with the processor 202 and with other peripheral devices of the multiple peripheral devices 250-1 . . . 250-P.

The register interface 310 includes one or more registers or register entries. Each register entry can be used, for example, for communication to or from (e.g., for communication into or out of) the peripheral device 250. For example, the processor 202 or another peripheral device can set or clear a register entry or can load a register entry with a value to communicate with the peripheral device 250. Conversely, the peripheral device 250 may change a value of a register entry to communicate with the processor 202 or another peripheral device. To enable this communication, the peripheral device 250 can expose at least part of the register interface 310 to the processor 202 or another peripheral device. For instance, the peripheral device 250 can provide the processor access to clear an interrupt state indication.

Generally, the register block can be used to communicate with the remainder of the peripheral logic to manage configuration and status communication, e.g., with software. In some cases, the register interface 310 can be implemented using control and status registers (CSRs). The CSRs provide a collection of registers within a peripheral device 250, the registers of which are addressable at least by the local host processor 202 via a circuit-wide, or chip-wide, address map. The CSRs can be standardized to enhance software uniformity and to facilitate circuit reuse and documentation consistency. Example aspects of the register interface 310 are described below with reference to FIG. 3-3.

The security function module 312 implements a security-related function of the peripheral device 250. Security-related functions include core or primary security functions and supporting or secondary security functions. Core security functions can include, for example, alert handling, cryptographic operations including encrypting and decrypting, random-number generation, secure data storage including storing and accessing secret data (e.g., key management), and so forth. Supporting security functions can include those that enable or facilitate performance of the core functions. Examples of supporting security functions include memory storage, memory control, timing, circuit and chip I/O control, environmental sensors, bus hosting, and so forth.

The interface 302 generally, or any of the specific example interfaces (e.g., the interconnect interface 304, the inter-device interface 306, or the other interface 308), can establish at least one register for the register interface 310 to enable a respective interface communication capability or feature. Regarding the interconnect interface 304, the interconnect interface 304 implements a communication interface that couples to the interconnect 110 to enable, for example, a connection between the peripheral device 250 and the processor 202 that adheres to a common framework. With the peripheral device 250 and the processor 202 comporting with the same common framework, device-processor communications in both directions can be standardized and predictable. The interconnect interface 304 can operate across the interconnect 110, can use at least one register of the register interface 310, can use a separate bus or independent wires, some combination thereof, and so forth. In operation, the peripheral device 250 can use the interconnect interface 304 to engage in at least one interconnect communication 314. Additionally or alternatively, the peripheral device 250 may use the interconnect interface 304 to communicate with another peripheral device via the interconnect 110.

The inter-device interface 306 implements a communication interface between the peripheral device 250 and one or more other peripheral devices that adhere to a common framework. With the peripheral device 250 and each other peripheral device comporting with the same common framework, device-device communications in both directions can be standardized and predictable. The inter-device interface 306 can use at least one register of the register interface 310, can use a bus dedicated to the peripheral devices, can use one or more independent wires extending between two peripheral devices, some combination thereof, and so forth.

In operation, the peripheral device 250 can use the inter-device interface 306 to engage in at least one inter-device communication 316. By bypassing the interconnect 110 to communicate with another peripheral device, the peripheral device 250 can communicate "directly" with the other peripheral device in some implementations. Further, by establishing and adhering to an inter-device communication scheme, consistency and certainty are promoted for communications between two or more devices. Accordingly, designers can focus on achieving the intended security-related function of the security function module 312 instead of expending time and resources tracking and double-checking numerous ad hoc communication regimes.

The other interface 308 implements a communication interface between the peripheral device 250 and another circuit component that adheres to a common framework. With the peripheral device 250 and the other circuit component comporting with the same common framework, peripheral device signaling in both directions can be standardized and predictable. An example of the other interface 308 is a chip I/O interface for communicating information externally. Another example of the other interface 308 is an interrupt interface, if interrupts are not communicated fully via the interconnect 110. Yet another example of the other interface 308 is a clock interface. In some cases, the security circuitry 106 (not separately indicated in FIG. 3) includes a primary system clock and one or more secondary system clocks. A clock interface can utilize the primary system clock and at least a selected portion of the secondary system clocks for communication timing and general functionality. The clock interface can operate in accordance with a clock scheme for the security circuitry 106, and design code for the peripheral device 250 can specify the clocks that are relevant to the peripheral device 250. In operation, the peripheral device 250 can use the other interface 308 to engage in at least one other communication 318 with another circuit component, like I/O circuitry or a clock tree.

FIG. 3-2 illustrates an example approach 300-2 to analyzing a peripheral device design to ensure comportable objectives are satisfied. In example implementations, the approach 300-2 uses an interface specification 332 that can include an interconnect scheme 334, an inter-device scheme 336, or another scheme 338 (including each of the schemes). The interface specification 332 corresponds to the interface 302 (of FIG. 3-1). The interconnect scheme 334 corresponds to the interconnect interface 304, the inter-device scheme 336 corresponds to the inter-device interface 306, and the other scheme 338 corresponds to the other interface 308. These schemes can additionally or alternatively include a local or chip-level I/O scheme, an interrupt scheme, a clock scheme, and so forth.

Accordingly, the interface specification 332 can establish the rules, protocols, attributes, options, capabilities, etc. for the interface 302. Similarly, each of the interconnect scheme 334, the inter-device scheme 336, and the other scheme 338 can respectively establish the rules, protocols, attributes, options, capabilities, etc. for the interconnect interface 304, the inter-device interface 306, and the other interface 308. During design time, the designer develops each peripheral device 250 to adhere to each relevant scheme of the interface specification 332. For instance, the inter-device scheme 336 may establish a format for defining inter-device signaling that bypasses the interconnect 110 of the security circuitry 106. By doing so, a comportable peripheral device 250 can be produced that enhances interoperability and reduces design and development time, as well as testing and debugging efforts. For example, a peripheral device 250 can communicate a signal (e.g., an inter-device signal) to another peripheral device using circuitry derived from an attribute specified by the design code for the peripheral device.

In example approaches, a comportability analysis module 340 can perform an analysis 344 of design code to check for comportability: A designer produces a peripheral device design code 342 with reference to the interface specification 332. Thus, the peripheral device design code 342 meets comportability objectives by adhering to the interface specification 332. The peripheral device design code 342 may be realized at least partially using, for instance, a configuration file. The peripheral device design code 342 can include one or more indications of processor-device signaling 348 (e.g., defining aspects of an interconnect communication 314 between a peripheral device 250 and a processor 202), one or more indications of inter-device signaling 350 (e.g., defining aspects of an inter-device communication 316 between a peripheral device 250 and another peripheral device), and so forth. The one or more indications of inter-device signaling 350 can relate, for instance, to signals exchanged between two or more peripheral devices, including without using the interconnect 110 of the security circuitry 106. These indications can follow the rules and guidelines for registers, signal naming, data types, timing, and so forth for these signals.

Descriptions in the peripheral device design code 342 result in circuit components in the security circuitry 106. For example, regarding an inter-device interface 306 of a respective peripheral device 250 (e.g., of FIG. 3-1), based on an attribute included in the design code 342 therefor, the inter-device interface 306 can be coupled to at least one wire that extends to another peripheral device to enable inter-device signaling. By specifying inter-device signaling 350 in the design code 342, interoperability and communication certainty are increased. The interface specification 332 or the configuration file of the design code 342 can indicate the peripheral features that are mandatory (for a given specification or design in this example instance of the present disclosure) and those that are optional in a given comportability framework. Thus, compliant design code may include a mandatory portion and an optional portion in some situations. Generally, the design code 342 can be formatted in accordance with any IC design or configuration platform. Examples include Verilog, Python, Hjson, and so forth.

In operation, the comportability analysis module 340 accepts the peripheral device design code 342. With reference to the interface specification 332, the comportability analysis module 340 performs an analysis 344 to check whether the peripheral device design code 342 is compliant with the specified common framework. The comportability analysis module 340 can compare the peripheral device design code 342 to one or more of the interconnect scheme 334, the inter-device scheme 336, or the other scheme 338 to check whether the code meets the specifications of each. Any of these schemes may include specifications relating to interrupts, register usage, and so forth. Based on the analysis 344, the comportability analysis module 340 produces a comportability report 346.

The comportability report 346 indicates whether the peripheral device design code 342 passes the analysis 344 by meeting the criteria of the interface specification 332. If not, the comportability analysis module 340 can include a list of "infractions" in the comportability report 346. Each infraction can include a reference to the code portion that is causing a failure indication or a reference to the part of the interface specification 332 that is being violated. Although the interface specification 332, the comportability analysis module 340, and the peripheral device design code 342 may be described with regard to an example security circuitry environment, the interface specification 332, the comportability analysis module 340, or the peripheral device design code 342 may be implemented in other environments. Accordingly, a comportability report 346 may cover an analysis of general circuit designs.

FIG. 3-3 illustrates at 300-3 an example peripheral device 250 including a register interface 310 and example communication signals. In FIG. 3-3 generally, but by way of example only, communication channels or signals that are mandatory (in this example instance of the present disclosure) are depicted with solid lines, and communication channels or signals that are optional are depicted with dashed lines. In other instances, however, different channels or signals may be mandatory or optional. Further, lines in other figures that are solid or dashed are not necessarily indicative of a requirement or a lack of a requirement, respectively, under a given interface specification.

In example implementations, various signals can be specified as part of a framework for comportability to which the peripheral device 250 is to adhere. Starting with the top left, a bidirectional signaling 362-1 using the interconnect 110 is depicted with the peripheral device 250 functioning as a device (e.g., functioning as a follower) relative to the interconnect 110. Below that, the peripheral device 250 is shown as receiving at least one clock signal 364 and at least one development mode signal 365. The development mode signal 365 represents an indication to the peripheral device 250 of what mode the security circuitry 106 or an overall SOC is currently operating in. In other words, there can be multiple modes of operation. With two example modes, the multiple modes can include a development mode and a production mode. The mode indication may determine, for instance, how software errors are handled. Other modes may enable a security feature that conveys the full life cycle mode status to the peripheral device.

The peripheral device 250 can also generate or output at least one interrupt signal 366 or at least one alert signal 368. Further, a bidirectional signaling 362-2 using the interconnect 110 is depicted with the peripheral device 250 functioning as a host (e.g., functioning as a leader) relative to the interconnect 110. The peripheral device 250 can further engage in bidirectional signaling 367 with the GPIO interface 220 or other chip I/O circuitry. Regarding the register interface 310, at least one outgoing signal 369-1 is labeled as a register-to-hardware (Reg2Hw) signal. At least one incoming signal 369-2, on the other hand, is labeled as a hardware-to-register (Hw2Reg) signal. Generally, in some implementations, certain features are deemed mandatory, while other features are considered optional. These mandatory and optional categories may, however, vary between different implementations. With a comportable design, these two categories can be assigned per-feature so that each peripheral device 250 interoperates with other peripheral devices appropriately.

Having generally described schemes, techniques, and hardware for peripheral devices in a comportable paradigm, including for an example cryptographic coprocessing peripheral device having a secure cryptographic coprocessor, this discussion now turns to schemes, techniques, and hardware for the secure cryptographic coprocessor.

Example Schemes, Techniques, and Hardware for a Secure Cryptographic Coprocessor This section describes examples of cryptographic coprocessors that can be included in security circuitry 106 (e.g., of FIGS. 1 and 2). The cryptographic coprocessing block or module can attach to the interconnect 110 (e.g., a system bus) as a peripheral device, such as in accordance with the comportability principles described above. Additionally or alternatively, the cryptographic coprocessor 118 may have "direct" or exclusive bus access to, or with, one or more other components, such as a peripheral device 250 or a processor 202 (e.g., of FIG. 2).

Figure 4:
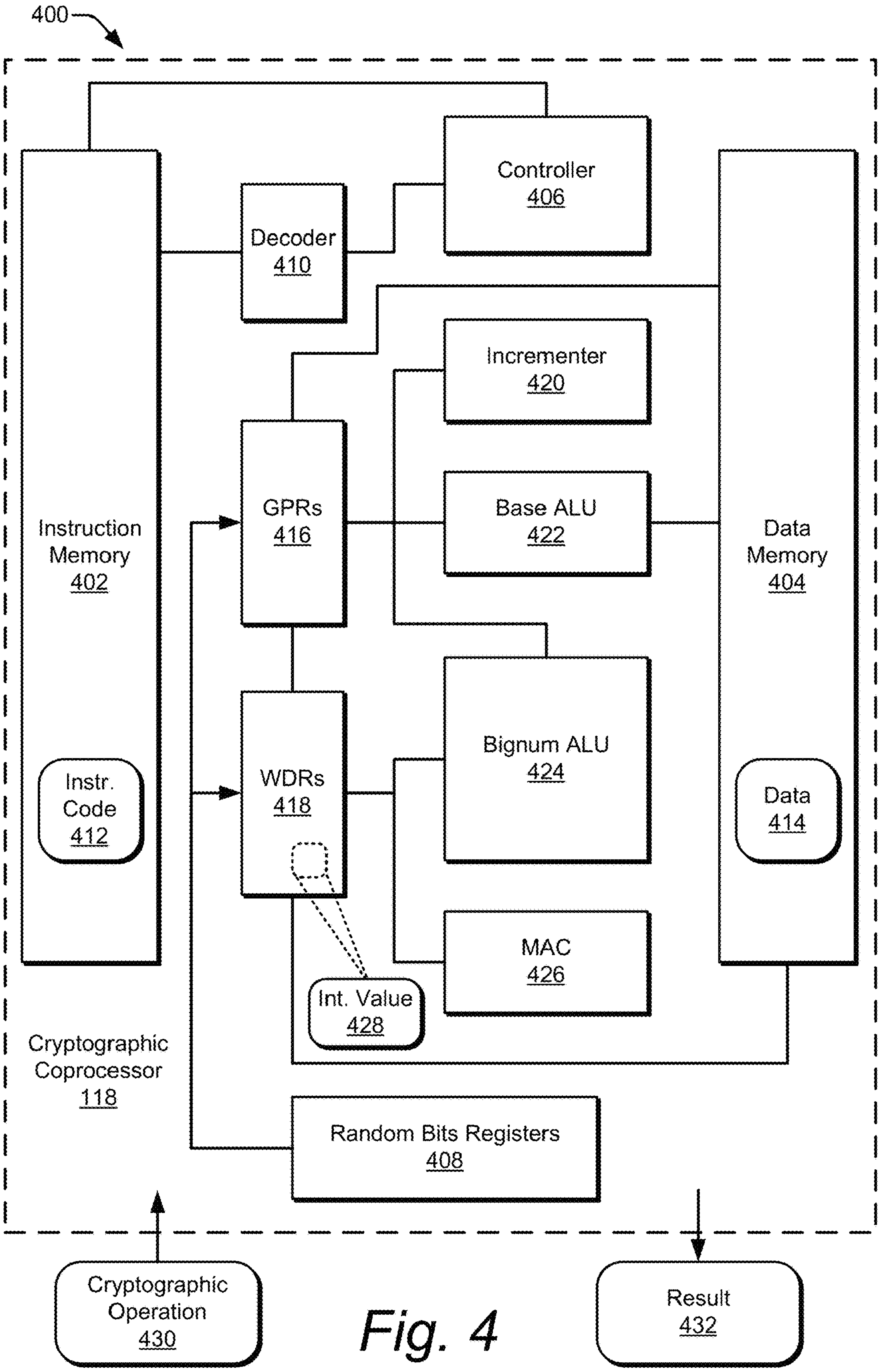
FIG. 4 illustrates an example schematic diagram in accordance with certain cryptographic coprocessor implementations.

FIG. 4 illustrates an example schematic diagram 400 in accordance with certain cryptographic coprocessor implementations. As shown in the schematic diagram 400, an example cryptographic coprocessor 118 can include an instruction memory 402, a data memory 404, a controller 406, multiple registers 408 that store random bits, and a decoder 410. The instruction memory 402 can store instruction code 412, and the data memory 404 can store data 414. In terms of example register storage, the cryptographic coprocessor 118 can include one or more sets of registers, such as general-purpose registers (GPRs) 416 and/or wide data registers (WDRs) 418.

With regard to example computational units, the cryptographic coprocessor 118 can include an incrementer 420, a base ALU 422, a big number ("bignum") ALU 424, and a multiply and accumulate (MAC) unit 426. Although only certain components are depicted in FIG. 4 and described herein as being part of the cryptographic coprocessor 118, this is by way of example only. More, fewer, replicated ones of, and/or different components may be included. For example, the cryptographic coprocessor 118 may also include a load and store unit (LSU) (or load-store unit) that couples the data memory 404 to other components. The LSU can act as a bidirectional interface for data accesses such as reads and writes. Further, the cryptographic coprocessor 118 can include one or more other registers as described herein, such as the CSRs of a register interface 310 (of FIG. 3-3).

In example implementations, the various depicted components can be coupled together as illustrated in FIG. 4. For instance, the multiple random-bits registers 408 may be coupled to the two sets of registers: GPRs 416 and WDRs 418. The controller 406 and the decoder 410 can be coupled to the instruction memory 402. The two sets of registers can be coupled (e.g., bidirectionally) to the computational units. Additionally, the data memory 404 may be coupled to the registers and/or the computational units, such as via an LSU (not shown). The illustrated connections between components are depicted in FIG. 4 by way of example only. More, fewer, duplicated ones of, and/or different connections may be present. For example, the controller 406 may be coupled to any of the computational units and/or the random bits registers 408.

In example operative scenarios, the decoder 410 can obtain one or more instructions of the instruction code 412 from the instruction memory 402. After decoding by the decoder 410, the controller 406 can execute the instructions based on a current program counter (PC) (not shown). The decoder 410 and controller 406 can provide control-flow support with conditional branch and unconditional jump instructions, hardware loops, and hardware-managed call/return stacks. The controller 406 can execute an instruction based on the decoding using one or more computational units, such as the base ALU 422 or the bignum ALU 424. As part of the execution of the instruction code 412, the controller 406 can store "working data" and other state in the registers.

The registers may have different widths. For example, the bank of the GPRs 416 may be 32 bits wide to store a 32-bit word per register or register entry. The GPRs 416 can feed and/or receive results from the incrementer 420 and the base ALU 422. The bignum ALU 424, in contrast, can operate on larger pieces of data, such as 128, 256, or 512 bits. Operating on wider data to perform wide-integer arithmetic can facilitate performing many cryptographic operations. The register bank of the WDRs 418 can store this wider data, such as a 256-bit data item. The MAC 426 can also operate on the wider 256-bit data and store information in an accumulator (ACC) register (not shown). As depicted in FIG. 4, the wider computational units, such as the bignum ALU 424, can also receive narrower data, such as eight occurrences of 32-bit data values from the GPRs 416 or the incrementer 420 to obtain a 256-bit data item. Also, although certain bit widths (e.g., 32, 64, 128, 256, and 512) for registers, words, data paths, computation units, and the like are described herein, these are provided by way of example only. Narrower or wider bit widths, different combinations of bit widths, and so forth may be implemented instead.

In some implementations, the cryptographic coprocessor 118 can support a processor, such as the processor 202 (of FIG. 2), by efficiently and/or quickly performing cryptographic operations. The processor 202 initially determines a cryptographic operation 430 to be performed. Examples of cryptographic operations 430 include asymmetric cryptographic operations like RSA and elliptic curve cryptography for security-sensitive public-key schemes and symmetric cryptographic operations (e.g., for SHA2-512, HMAC-SHA-512, and AES-256), which may relate to less sensitive cryptographic operations. The processor 202 transmits a request to perform the cryptographic operation 430. The request can be transmitted, for example, via an interconnect (e.g., the interconnect 110 of FIGS. 1 and 2) or via a dedicated pathway between the processor 202 and the cryptographic coprocessor 118. In some cases, the transmission can include loading an operation code and/or data into one or more registers of the cryptographic coprocessor 118.

Thus, the cryptographic coprocessor 118 receives from the processor 202 the request to perform the cryptographic operation 430. The cryptographic coprocessor 118 performs the cryptographic operation 430 with the data 414 using the instruction code 412 and an intermediate value 428 to obtain a result 432. The intermediate value 428 is an example of state (also called here "state information"; it refers to any data, such as variable data, present in the cryptographic coprocessor) held by the cryptographic coprocessor 118, including while performing a cryptographic operation 430. Examples of intermediate values can include instances of the data 414 that have been copied or moved into a register, values produced while performing a cryptographic operation that do not represent a final result, outputs of computational units, contents of registers "within" a computational unit, and so forth.

Each intermediate value 428 can be stored in, for instance, at least one register. Such registers may include the GPRs 416, the WDRs 418, the ACC of the MAC 426, and so forth. Accordingly, although an intermediate value 428 is shown relative to a WDR 418, state information—including at least one intermediate value 428—can be stored in other locations of the cryptographic coprocessor 118. These other locations of state information, besides other registers, can include the decoder 410, the base ALU 422, the bignum ALU 424, and the like. State information can also include one or more flags in these or other components. The cryptographic coprocessor 118 protects at least one of the data 414, the intermediate value 428, or the instruction code 412 from unauthorized access.

Accordingly, information (e.g., data 414, instruction code 412, or processor state like an intermediate value 428) is protected by the cryptographic coprocessor 118 using one or more of the techniques described herein. The protection can exist during the time in which the cryptographic operation 430 is performed and/or can occur before or after that time period. The protection can extend at least across the components of the cryptographic coprocessor 118, including any interfaces or communication-related registers thereof. After determining the result 432 of the cryptographic operation 430, the cryptographic coprocessor 118 provides the result 432 to the processor 202. The cryptographic coprocessor 118 can, for example, expose the result 432 to the processor 202 using a register of the cryptographic coprocessor 118, drive the result 432 on the interconnect 110 or a private/dedicated bus, and so forth. As another example, the cryptographic coprocessor 118 can write the result 432 to the data memory 404. Responsive to the cryptographic coprocessor 118 signaling to the processor 202 that the cryptographic operation 430 is complete, the processor 202 can read the result 432 from the data memory 404.

Figure 5:
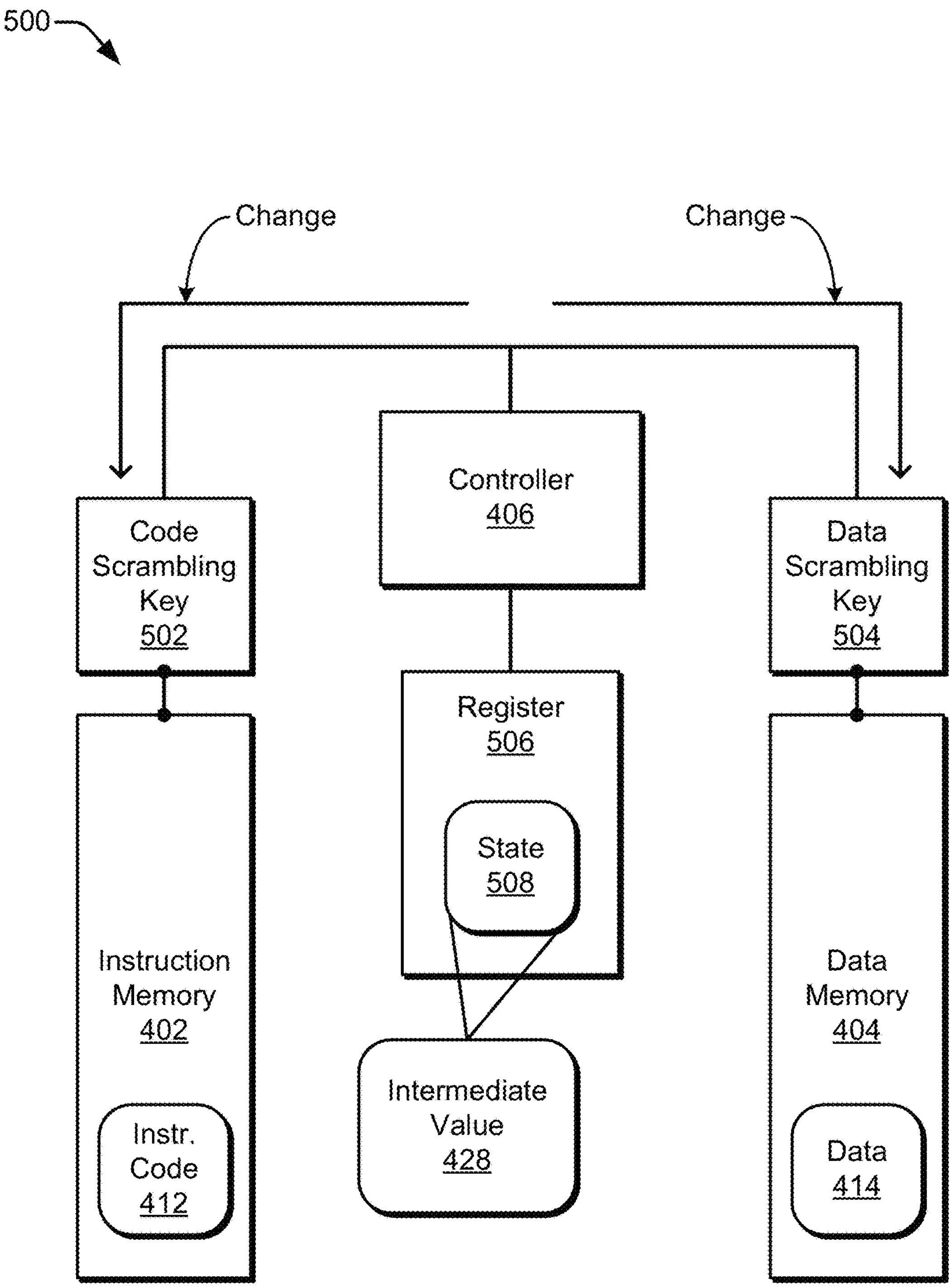
FIG. 5 illustrates example schemes for securely wiping information in a cryptographic coprocessor.

FIG. 5 illustrates example schemes 500 for securely wiping information in a cryptographic coprocessor. As shown, the cryptographic coprocessor includes, in addition to the instruction memory 402 and the data memory 404, at least one register 506. The register 506 stores state 508, such as at least one intermediate value 428. The register 506 can be located at, or be a part of, any of the components depicted in FIG. 4, for example. The cryptographic coprocessor 118 also includes one or more scrambling keys, such as a code scrambling key 502 and a data scrambling key 504. The scrambling keys can be stored separately or together, such as in one or more registers that are coupled to, or otherwise accessible by, the controller 406 or other logic that can apply the scrambling keys to information and/or securely wipe the scrambling keys.

In example implementations, the controller 406 uses the code scrambling key 502 to scramble or encrypt the instruction code 412. The controller 406 uses the data scrambling key 504 to scramble or encrypt the data 414. To protect information stored in at least one memory, the cryptographic coprocessor changes at least one scrambling key that is used to scramble that information. Here, memory may include the register 506 as well as the instruction memory 402 and the data memory 404. Changing the corresponding scrambling key is a fast and efficient approach to securing the scrambled contents of a memory if suspicious activity is detected or if access to the cryptographic coprocessor 118 is to be transferred between two mutually untrusting applications that are executing on the processor 202.

With regard to the data memory 404, the cryptographic coprocessor (e.g., the controller 406 or other logic) can change (e.g., alter or replace) the data scrambling key 504 to render the data 414 meaningless. Regarding the instruction memory 402, the cryptographic coprocessor can change the code scrambling key 502 to render the instruction code 412 meaningless. This change can be accomplished in as little as a single cycle. In some cases, the change to a scrambling key can entail overwriting at least one register, which stores the scrambling key, with random bits. The logic can further overwrite the random bits in the at least one register with zeros or any other constant value, such as a compile-time random netlist constant.

The cryptographic coprocessor can also protect the state 508, including an intermediate value 428, by overwriting at least one register 506 with randomness, such as one or more random bits. In some cases, protection of the state 508 can entail overwriting the at least one register 506, which stores the intermediate value 428, with random bits. The logic can further overwrite the random bits in the at least one register 506 with zeros. This two-step process can thwart some attacks that are based on observing power signatures.

The secure wipe can be triggered in a number of manners. First, software running on the processor 202 can "manually" trigger a secure wipe. Second, a secure wipe can be triggered responsive to an alert, which may be internal to the cryptographic coprocessor 118 or from an external component. Third, the cryptographic coprocessor 118 can automatically trigger a secure wipe for an internal cleansing operation. Additional and alternative example implementations for protecting information, including instruction code, data, and state information, are described herein.

Figure 6:
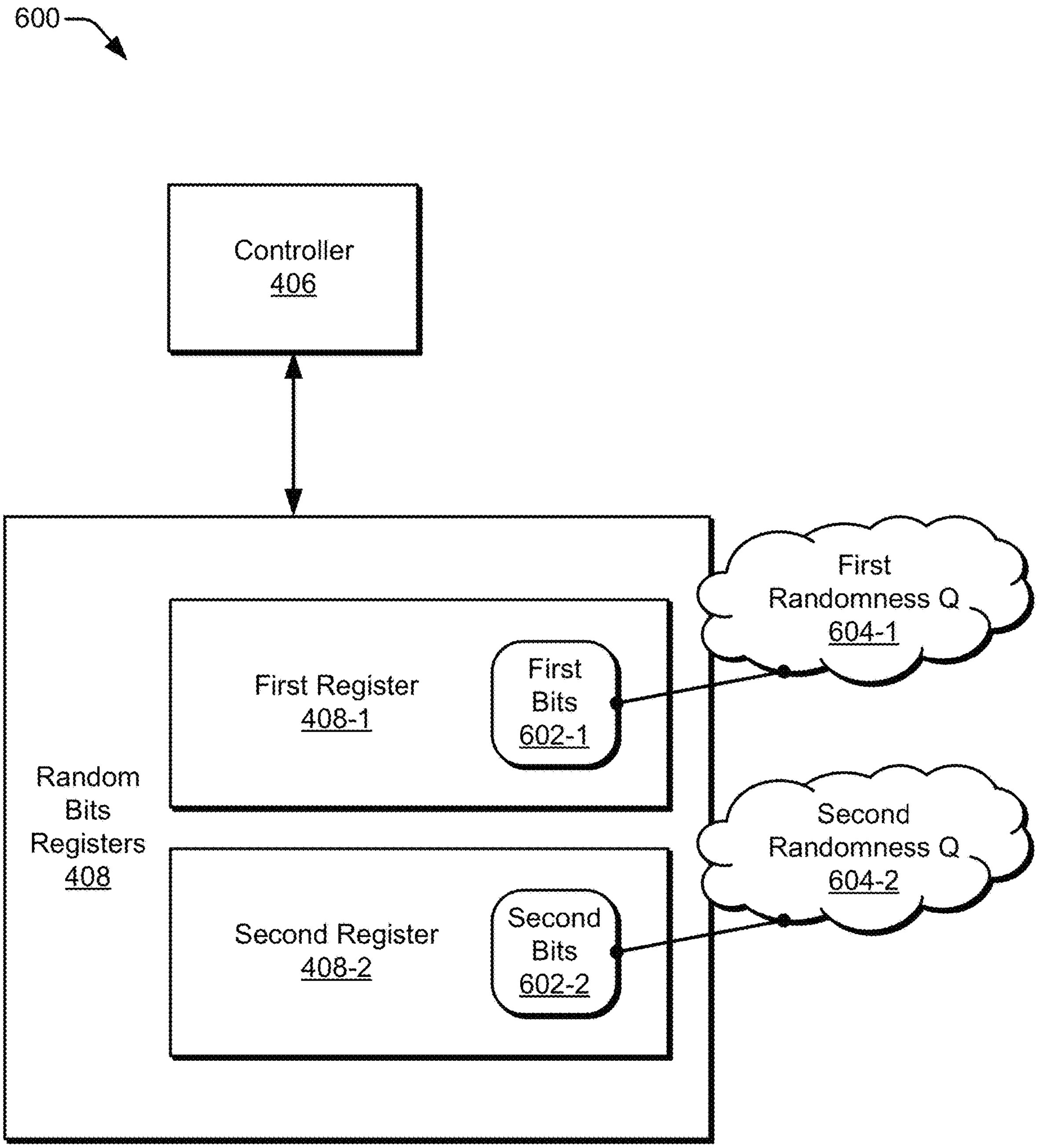
FIG. 6 illustrates example schemes for efficiently providing randomized bits to support secure operations of a cryptographic coprocessor.

FIG. 6 illustrates example schemes 600 for efficiently providing randomized bits to support secure operations of a cryptographic coprocessor. As shown, the multiple registers 408 with randomized bits can include at least a first register 408-1 and a second register 408-2. The first register 408-1 can store multiple first bits 602-1 that are randomized according to a first randomness quality 604-1, and the second register 408-2 can store multiple second bits 602-2 that are randomized according to a second randomness quality 604-2, different from the first randomness quality 604-1. The cryptographic coprocessor 118 therefore has access to randomized bits in at least two registers with varying or different levels of randomness quality.

In example implementations generally, the random bits registers 408 can include two or more registers. Each respective register 408-X can store a respective set of multiple bits 602-X that are associated with a respective quality of randomness 604-X, with "X" representing a positive integer greater than one. The multiple registers 408-1 and 408-2 enable fast access to the multiple random bits 602-1 and 602-2 at multiple levels of randomness quality 604-1 and 604-2, respectively. Having random bits with different levels of randomness quality can efficiently balance "cost" versus quality, as is explained next.

Some cryptographic operations and/or standards involve or stipulate a certain quality level of randomized bits. In certain situations, however, the higher the quality of the randomized bits, the greater is the cost to procure the randomized bits. The cost may pertain to power or time. In other words, a higher quality of randomization may entail a greater power expenditure and/or may consume a longer time to produce the randomized bits. Employing multiple registers 408 enables the cryptographic coprocessor to have rapid access to multiple qualities of randomness while balancing the relative costs of each. In other words, if a cryptographic operation or another operation supporting the functionality of the cryptographic coprocessor 118 can use a lower quality of randomness that is associated with a lower cost, the controller 406 may select the bits associated with the lower randomness quality.

In some implementations, the first register 408-1 stores multiple first bits 602-1 corresponding to a first quality of randomness 604-1. The second register 408-2 stores multiple second bits 602-2 corresponding to a second quality of randomness 604-2. In example operations, the controller 406 can selectively retrieve the multiple first bits 602-1 from the first register 408-1 or the multiple second bits 602-2 from the second register 408-2 based on a randomness quality 604 associated with the cryptographic operation 430 (e.g., of FIG. 4), including a "sub-operation" thereof.

With relative qualities of randomness, the first quality of randomness 604-1 can be, for example, higher than the second quality of randomness 604-2. In such cases, the multiple first bits 602-1 can correspond to a non-deterministic source for random numbers (e.g., an unpredictable source of bits, such as an analog-based entropy source for random numbers). The multiple second bits 602-2 can correspond to a deterministic source for random numbers (e.g., a digital-based source that may entail some degree of predictability of future values based on past values for random numbers). To ensure that the cryptographic coprocessor 118 does not need to stall while waiting for, e.g., higher quality randomized bits, the controller 406 can prefetch the multiple first bits 602-1 into the first register 408-1 before the multiple first bits 602-1 are to be used.

The first (relatively higher) quality of randomness 604-1 can be, for example, compliant with one or more random-number-generation and/or cryptographic-related standards (e.g., a class PTG.2 specification or an AIS31-compliant class PTG.3 specification). The multiple first bits 602-1 can have a guaranteed entropy with forward and backward secrecy: Randomized bits of this quality can be used, for instance, for key generation. These randomized bits can be sourced from an entropy distribution network (EDN) via a single-entry cache, which can be realized as at least one register and may be integrity protected. The cache, regardless of number of entries, may be capable of holding more bits than the controller 406 extracts at any one time. Reads when the cache is empty can cause the cryptographic coprocessor to be stalled until a new random number is fetched from the EDN, but such a stall can be averted by appropriately prefetching bits into the cache prior to the read. This first, higher quality of randomness 604-1 can correspond to the RND description below:

The second (relatively lower) quality of randomness 604-2 can be produced faster and/or with a lower amount of power. The multiple second bits 602-2 may correspond to a random number without guaranteed secrecy properties or specific statistical properties. Such bits can be used, for example, in masking and blinding schemes or to randomize the control flow of an application. The randomized bits can be sourced from a local pseudo-random number generator (PRNG), including a lightweight PRNG. PRNG examples include an xoshiro PRNG or a PRNG that uses one or more linear feedback shift registers (LFSRs) to digitally produce additional randomized bits. The LFSR can be implemented with a Galois-type LFSR having an output that is shuffled by an SBOX. The production may be sufficiently fast such that the cryptographic coprocessor need never stall, even without prefetching. This second, lower quality of randomness 604-2 can correspond to the URND description below. Additional and alternative example implementations for generating, storing, or accessing randomized bits with different qualities of randomness are described herein.

Figure 7:
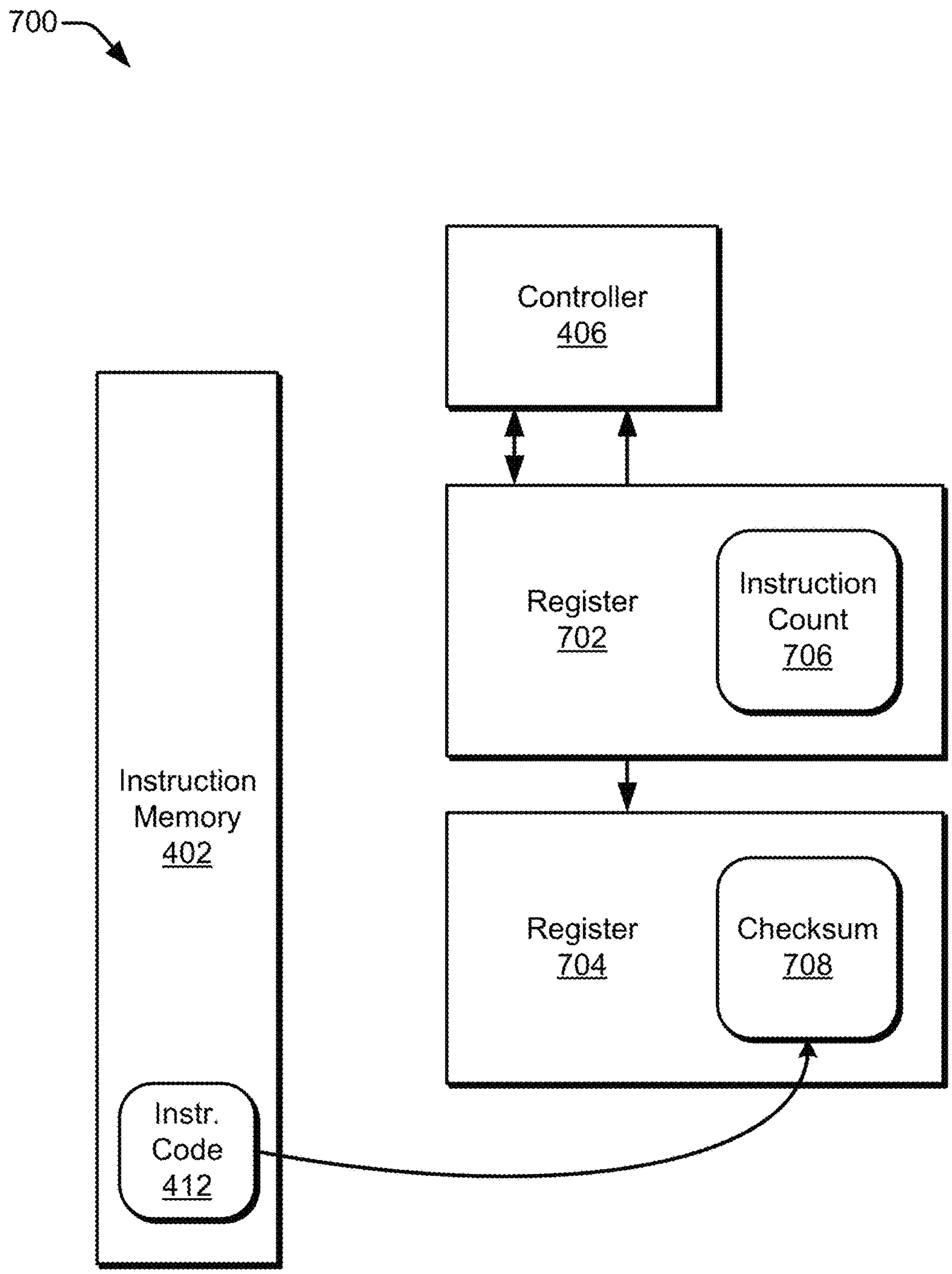
FIG. 7 illustrates example schemes for verifying the secure execution of instruction code by a cryptographic coprocessor.

FIG. 7 illustrates example schemes 700 for verifying the secure execution of instruction code by a cryptographic coprocessor. As illustrated, the cryptographic coprocessor 118 can include multiple registers for securing the execution of the instruction code 412. For described implementations, two registers are shown, but one or more than two may be used instead. One register 702 can store an instruction count 706. Another register 704 can store a checksum 708.

In some implementations, the controller 406 can track how many instructions of the instruction code 412 have been executed as the instruction count 706 in the register 702. The register 702 can be realized as, or can function as, an instruction counter. Thus, the value of the instruction count 706 can represent a quantity of executed instructions for performing an operation, such as a cryptographic operation 430 (e.g., of FIG. 4). The cryptographic coprocessor 118 can provide the quantity of the executed instructions to the processor 202 as the instruction count 706.

The instruction count 706 can be provided by exposing to the processor 202 the value in the register 702 or another register (e.g., as described above with reference to FIGS. 3-1 to 3-3). Additionally or alternatively, the cryptographic coprocessor 118 can transmit the value of the instruction count 706 to the processor 202 via the interconnect 110 or a dedicated communication path. The processor 202 can verify that the instruction count 706 matches an expected number of executed instructions for a given operation. If not, the processor 202 can generate an alert.

In other implementations, the controller 406 can run a check over the instruction code 412 to generate a checksum 708. The check may be performed using, for instance, a hashing operation to generate the checksum 708. If the instruction code 412 has been modified, the checksum 708 will fail to match the checksum known to the processor 202. The checksum 708 can be derived from all or part of the instruction code 412 that is currently stored in the instruction memory 402 or that is being loaded into the instruction memory 402. The checksum 708 can be generated using, for instance, a cumulative CRC checksum (e.g., a 32-bit CRC-32-IEEE checksum) that is updated on each write to the instruction memory 402. The cryptographic coprocessor 118 can provide the checksum 708 to the processor 202. In some implementations, the controller 406 can also generate the checksum 708 over the data 414 stored in the data memory 404 (e.g., of FIGS. 4 and 5). Thus, the checksum 708 can be used to jointly verify the integrity of the instruction code 412 in combination with the data 414. Alternatively, the controller 406 can generate a checksum over the data 414 separately from the instruction code 412 so that the integrity of the data 414 may be independently verified.

The checksum 708 can be provided by exposing to the processor 202 the value in the register 704 or another register (e.g., as described above with reference to FIGS. 3-1 to 3-3). Additionally or alternatively, the cryptographic coprocessor 118 can transmit the value of the checksum 708 to the processor 202 via the interconnect 110 or a dedicated communication path. The processor 202 can verify that the checksum 708 matches an expected checksum value for a given piece of instruction code 412. If not, the processor 202 can generate an alert. The instruction count and checksum security schemes can be used separately or together. Additional and alternative example implementations for instruction count and checksum security schemes are described herein.

A multiply-with-accumulate (MAC) component is described next, and multiple security-related features are described thereafter. The multiple security-related features include some features that expand on, and/or further describe, those set forth above with respect to FIGS. 4 to 7. With an example multiply and accumulate (MAC) unit (e.g., the MAC unit 426 of FIG. 4), a wide integer multiplier is used to meet performance targets. Wide multiply units, however, can consume a significant silicon area and may impact the frequency of operation (e.g., when relatively lower pipelining is adopted for a given design to reduce design complexity and/or the attack surface).

A cryptographic coprocessor 118 can include, for instance, a 64-bit wide multiply circuit as a balance between reducing cycle counts and meeting frequency goals. (For some use cases, a, e.g., 128-bit wide multiply unit may be too slow or too costly in terms of area.) The cryptographic coprocessor 118 can be supplemented with a 256-bit accumulator to reduce the operations involved to perform wider multiplies. A multiply and accumulate operation can be executed in a single cycle. When using long multiplication, this means that the MAC unit can produce and accumulate one intermediate product per cycle with no need for separate addition instructions. For example, a 128-bit multiply can be completed in 4 cycles, and a 256-bit multiply can be completed in 16 cycles.

Various example security-related features are described below. Each described feature may include specific implementations that are enumerated by way of example only and not limitation. Some of the described security features are designed to combat particular threats or avenues of attack. Accordingly, each security feature may include an explanation of appropriate corresponding countermeasures. Nineteen (19) security-related features for a cryptographic coprocessor 118 are set forth as follows.

First, an integrity protection code can be implemented. To provide overarching integrity protection for information (e.g., data or instructions) without regularly reencoding the information (which can be a potential fault injection point), the same integrity protection code can be used in various portions of the coprocessor, including up to all portions of the coprocessor. The protection can be applied to, e.g., 32-bit data words and can produce 39 bits of encoded data including the seven error-correction code (ECC) bits. In some cases, the protection code may be an inverted (39, 32) Hsiao SEC-DED ECC. This has a minimum Hamming distance of four, resulting in the ability to detect up to three errors in the encoded 39-bit word. This example protection code can be used for error detection of up to three flipped bits: if so, no error correction is performed. In contrast to the original Hsiao code, the outputs in this version (or at least a portion of the bits thereof) can be inverted to produce a code in which the all-zero word (32'h0) and the all-one word (32'h1) is not a valid codeword. This enables detection of attacks that set all bits to zero or all bits to one.

Second, an information scrambling mechanism can be implemented. To provide information protection, scrambling can be performed using any of many different scrambling algorithms. For instance, a reduced-round PRINCE cipher may be employed to encrypt the information located at the cryptographic coprocessor, as well as other components of the security circuitry. For example, an architecture can use a reduced-round PRINCE cipher primitive in CTR mode in order to (e.g., relatively weakly) encrypt the data written to the memory macro. Plain CTR mode may not diffuse the data since the keystream may be "merely" XOR'ed onto it. Hence, byte-wise diffusion can be performed using one or more (e.g., relatively shallow) substitution/permutation network (S&P network) layers to provide an avalanche effect within a byte. Further, to break the linear addressing space, the address can be passed through a bijective scrambling function constructed using a (e.g., relatively shallow) substitution/permutation network and a nonce. Due to the nonce, the address mapping may not be statically specified by the register-transfer level (RTL) coding, and the address remapping can thus be changed at runtime as well.

Third, integrity protection can be applied to one or more of the register files. For example, the 32-bit GPRs and the 256-bit WDRs can store an ECC in addition to the data to detect glitches of stored data. Detected errors (e.g., any detected errors) can result in a fatal alert. Each 32-bit data word can be protected with a respective integrity protection code. Thus, in the 256-bit WDRs, respective ECCs can be individually applied to each 32-bit word. In some cases, the data and the corresponding integrity bits can be consumed by and emitted from the register file. If incoming data has no ECC attached thereto, the ECC is calculated before writing data to the register file after otherwise validating the integrity of the incoming data.

With respect to a register file, corresponding ECC bits can be passed through with data that is read from and/or for data that is written to the register file. Alternatively, the ECC bits may be removed when reading from the register file and/or omitted from a data transmission to a given internal unit, such as the ALU. For data that is produced by the ALU, ECC bits may be calculated for the produced data for storing in (or transmission to) the register file in conjunction with the produced data.

Fourth, integrity protection can be applied to data memory. The cryptographic processor's data memory may be 256 bits wide, but the data memory may still allow 32-bit-aligned 32-bit word accesses. The integrity of the data memory can be protected with an error detection code. Each (32-bit-aligned) 32-bit data word can be protected with a respective integrity protection code. Detected errors (e.g., any detected errors) can result in a fatal alert. In some cases, the reencoding of data can be avoided by, for instance, propagating ECC bits with the corresponding data around the coprocessor's various units, components, and other circuitries.

With respect to the data memory, data consumed within the coprocessor need not be reencoded. However, integrity bits can be preserved by the coprocessor using, e.g., a load-store unit (LSU) that interfaces with the data memory. Data that is accessed for a read or a write through the system bus need not be reencoded if the system bus propagates or provides the same type of ECC data. Here, the system bus can enable data transfer to or from other peripheral devices or the main processor as part of the interconnect.

Fifth, the data memory can be scrambled, e.g., using a scrambling key. The data memory of the cryptographic coprocessor can be scrambled to make it more tamper resistant. The data scrambling can also make detection of glitch attacks easier because single-bit glitches can produce an unpredictable result on the output due to the scrambling. The scrambling key can be changed (e.g., rotated, replaced, or modified) regularly, such as at least whenever a secure clear operation is initiated. Optionally, the cryptographic coprocessor may be operational to reverse the scrambling operation, e.g., upon receiving a request for the (unscrambled) data, or upon being commanded to perform an operation on the (unscrambled) data.

Sixth, integrity protection can be applied to the instruction memory. The integrity of the instruction memory can be protected with an error detection code. For example, each (32-bit-aligned) 32-bit 'data' word can be protected with an integrity protection code. Detected errors (e.g., any detected errors) in the instruction code stored in the instruction memory can result in a fatal alert. As described above with respect to the data stored in the data memory, the reencoding of instructions to reproduce integrity code can be avoided in many situations by propagating and/or restoring the ECC bits.

With respect to the instruction memory, instruction code that is accessed, with a read or a write operation, through the system bus can be reencoded if the system bus does not utilize the same type of ECC data. Otherwise, the existing ECC data can be further propagated to or from the system bus, respectively. Generally, instructions read by the decoder can be integrity-checked before use, but the integrity data may then be discarded.

Seventh, the instruction memory can be scrambled, e.g., using a scrambling key, to scramble instruction code stored in the instruction memory. The cryptographic coprocessor's instruction memory can be scrambled to make it more tamper resistant. The scrambling can also enable glitch attacks to be detected more easily because single-bit glitches can have an unpredictable result on the output. The scrambling key can be changed (e.g., rotated, replaced, or modified) regularly, such as at least whenever a secure clear operation is initiated. Optionally, the cryptographic coprocessor may be operational to reverse the scrambling operation, e.g., upon receiving an instruction or command to perform an operation specified by the instruction code.

Eighth, different levels or qualities of random number generation (RNG) may be implemented. A cryptographic coprocessor can utilize a source of random numbers for various purposes. RNG may be used at least as part of software hardening schemes, so a reliable and timely source of random bits can contribute to a secure processing environment. Random bits can be obtained, for instance, via reads of at least one register, such as control and status register (CSR) and/or a wide special-purpose register (WSR).

In some cases, two sources of random bits can be provided with two different qualities of randomness. For example, a first quality can be denoted "RND," for random bits. This RND represents relatively higher quality bits that may meet certification "requirements" for cryptographic-strength randomness in accordance with one or more standards. These RND bits may be used, e.g., for key generation, and they can be sourced "directly" from EDN requests. A second quality may be denoted "URND," for "unlimited" random bits. (Although these bits may not be truly unlimited, they can be generated so quickly as to effectively appear to be an unlimited source of random bits from the perspective of the coprocessor.) This URND represents relatively lower quality bits. These lower quality bits can be sourced from, e.g., a local pseudo-random number generator (PRNG). In some cases, the PRNG can include at least one linear feedback shift register (LFSR) that is periodically reseeded from EDN requests.

In example implementations, the RND bits can be provided via a 256-bit cache. If a read to RND occurs when this cache is empty, an EDN request to fill it can be rapidly started, but the cryptographic coprocessor may still stall until the RND bits are available. Reading from RND may empty the cache. A prefetch, however, can be performed by reading from a special CSR that begins an EDN request to fill the RND cache. If the read to RND occurs a suitable time after the prefetch request, the cryptographic coprocessor need not stall. Generally, reads from URND do not block the cryptographic coprocessor due to the rate at which the randomized bits can be refilled.

Generally, an RNG scheme can include one or more of several different aspects. For example, a separate 32-bit random number source can be provided for the base ISA, or a 256-bit random number source can be used with excess bits being jettisoned. The LFSR can be reseeded under the control of the main processor or the cryptographic coprocessor or by software executing thereon. The reseeds can be, for instance, on a cyclical time interval or on a URND access interval. In some cases, software may control the refilling and/or flushing of the RND cache. Alternatively or additionally, the RND cache may be flushed and/or refilled responsive to the cryptographic coprocessor starting or being reset.

Ninth, the state (e.g., stored "working" information) of the cryptographic coprocessor can be hardened against attacks. Where there are state machines or other state values held in registers that do or that may affect the execution of the cryptographic coprocessor, these locations can be hardened against glitching. The table below (Table 1) identifies example states for a cryptographic coprocessor and corresponding example hardening strategies that can be applied in various implementations to protect the corresponding state information.

TABLE 1

Examples of state information for a cryptographic coprocessor versus example hardening techniques.

| Example States of a Cryptographic Coprocessor | Example Corresponding Hardening Technique(s) |
|---|---|
| Cryptographic coprocessor controller state | Sparse state encoding |
| Loop stack, each entry can contain:<br>Loop start program counter (PC)<br>Loop end PC<br>Remaining loop iterations | ECC or shadow inverted copies of the values in the loop stack and/or the loop stack circuitry thereof |
| Hardware call stack<br>Contains PCs that will be jumped to on function return | ECC or shadow inverted copies of the PCs and/or a register thereof |
| Current PC | ECC or shadow inverted copy of the PC (Control Flow Integrity (CFI) may also or instead address the protection of the current PC.) |
| Internal special purposes registers (ISPRs)<br>ACC-MAC Accumulator<br>MOD-Modulus for pseudo-mod instructions<br>FLAGS-flag groups 0 and 1, used for conditional select instructions | ECC or shadow inverted copies of the computational units and/or the flag memory locations |

Tenth, the cryptographic coprocessor can enable information (e.g., the state) thereof to be cleared. Associated with or as part of state hardening, the cryptographic coprocessor can provide a mechanism to securely clear information it stores (e.g., the state that it stores), including the instruction memory and the data memory. This mechanism can be implemented as a superset of other "secure clear" mechanisms, which may include the following: clear data memory, clear instruction memory, clear internal memory, combinations thereof, and so forth.

A secure clear mechanism can be triggered by, for instance, host software through a bus interface. This mechanism may be automatically initiated in certain situations in which the cryptographic coprocessor determines that the information it stores may be, or may have been, compromised. For example, the cryptographic coprocessor can initiate a secure clear, such as a full secure clear, in the following situations. One, a lifecycle controller can ask for a secure clear through an escalation signal. Two, a fatal alert may be issued. In this latter case, a secure clear can be performed as a local remedial action. In other situations, software can trigger an information clear by writing to a register, such as by writing "3'b111" to an associated register to set each of the individual information-clear bits as described below.

Eleventh, the cryptographic coprocessor can enable a data memory to be securely cleared. The data memory in the cryptographic coprocessor can be used to store sensitive data during operation and to exchange such data with the host processor. As described herein, a mechanism can be provided to securely clear the data memory on request. The data memory clearing can be performed by securely replacing a data memory scrambling key, which makes scrambled data stored in the data memory unusable.

By way of example only, the key replacement can be implemented as a two-part process. In a first part, the cryptographic coprocessor overwrites the scrambling key (e.g., 128 bits) of the data memory scrambling primitive with randomness, such as bits from a local LFSR. This action is deterministic in time and may be completed in as little as a single cycle. In a second part, the cryptographic coprocessor requests one or more new scrambling parameters from a module that provides a scrambling variable or key. This request may take multiple cycles to complete. In some cases, software can initiate a secure data clearing operation by writing to a register, such as by writing a "1" to a clear-data-memory register field.

Twelfth, the cryptographic coprocessor can enable an instruction memory to be securely cleared. The instruction memory in the cryptographic coprocessor can contain application or instruction code, which may be considered a protectable asset inasmuch as the code may contain secrets. Thus, a mechanism can be provided to securely clear the instruction memory on request. The instruction memory clearing can be performed by securely replacing an instruction memory scrambling key or code scrambling key, which makes scrambled instruction code stored in the instruction memory unusable.

By way of example only, the key replacement can be implemented as a two-part process. In a first part, the cryptographic coprocessor overwrites the scrambling key (e.g., 128 bits) of the instruction memory scrambling primitive with randomness, such as bits from a local LFSR. This action is deterministic in time and may be completed in as little as a single cycle. In a second part, the cryptographic coprocessor requests one or more new scrambling parameters from a module that provides a scrambling variable or key. This request may take multiple cycles to complete. In some cases, software can initiate a secure instruction code clearing operation by writing to a register, such as by writing a "1" to a clear-instruction-memory register field.

Thirteenth, the cryptographic coprocessor can enable state to be securely cleared. The cryptographic coprocessor can provide a mechanism to securely wipe general internal state, which can exclude the instruction and data memories for targeted state wiping. The wipe can target a portion of the state or "all" of the internal state. The following state can be wiped with random data, such as that from a local LFSR. State can include register files, such as GPR and WDR (e.g., a general-purpose register or a wide data register). State can also include an accumulator register, which may be otherwise accessible through the ACC WSR. State can further include software-writable special-purpose registers, such as flag and mode registers.

Further, as part of the clearing of the internal state, loop and/or call stack pointers can be reset. In some cases, a secure wipe of all internal states may take multiple cycles. Software can initiate a data-secure wiping of state information by writing to a register corresponding to the clearing of internal state. State may be cleared (e.g., the triggering of the state clearing may be made) responsive to the completion of one or more operations.

Fourteenth, unused data and/or control paths may be "blanked." Blanking, which may also be called "squashing." can be used to guard against power or electromagnetic signatures leaking data unrelated to the instructions that are being executed. With this technique, the cryptographic coprocessor can blank signals-like unused register file addresses or unused data paths-through functional units to a constant or fixed/static value, which may be a zero or a non-zero value. This blanking can prevent, or at least reduce the likelihood of, a power or electromagnetic signature from data unrelated to the instruction being executed from being detectable. This technique may be implemented with only a small area cost and timing impact. The blanking may be selectively applied to different data and/or control paths.

Fifteenth, a checksum can be used to secure executable instructions based on the instruction code loaded into the instruction memory. The cryptographic coprocessor can calculate a checksum over instruction code that is written into the instruction memory. The cryptographic coprocessor can further make this checksum available to host software, such as via a bus-accessible CSR. In this manner, the checksum may be available in a designated register for retrieving by the host processor. Thus, this checksum can be used by the host processor as a relatively lightweight integrity check to ensure that the instruction code written to the cryptographic coprocessor has been received and stored correctly.

The checksum can be computed in any of multiple different manners. For instance, a cyclic redundancy check (CRC) with 32 bits (CRC32) or another checksum can be calculated on the fly as instruction code is written to the instruction memory. The checksum can therefore depend on the ordering of the incoming instruction code data. Additionally or alternatively, the instruction code can be read out sequentially responsive to a request for the checksum, but this process may take longer to provide the checksum and/or introduce processing delays.

With respect to implementations that provide a checksum over instruction code, example aspects can include reading back data from the main processor. Aspects can also include loading a relatively simple checksum (e.g., CRC32), which is computed over the instructions written by the main processor, into a CSR. The main processor can read the checksum back from the register and compare it to one computed by, or otherwise known to, the main processor. The cryptographic coprocessor can additionally or alternatively compute a checksum over data stored in the data memory. Thus, the cryptographic coprocessor can produce two separate checksums or a combined checksum. Aspects can further include incorporating ROM code into the cryptographic coprocessor to enable a stronger integrity check to be performed.

Sixteenth, an executed instruction count can be provided to host software. The cryptographic coprocessor can count the number or quantity of executed instructions since an operation was started. The cryptographic coprocessor can also provide the count to the host software, such as via a designated register. The number of executed instructions can be used by the host software to detect some forms of unexpected execution of the application being executed by the cryptographic coprocessor, such as an early termination of the execution. The host software can be responsible for interpreting this number appropriately. Some algorithms executed on the cryptographic coprocessor can usually, or even always, execute the same quantity of instructions (e.g., many encryption and decryption algorithms). Other algorithms, however, may have a more variable runtime or number of executed instructions (e.g., RSA key generation).

Seventeenth, an instruction decoder can be duplicated. The cryptographic coprocessor can include duplicated decode logic and at least some replication of the control logic. One of the duplicate logic blocks can output inverted signals. In some cases, signal inversion is realized using more than NOT gates on the output of the duplicated block such that the logical implementation of each block is different. Where control signals reach execution blocks, circuitry can check to verify that the duplicated signals are inversions of one another. If not, the checking circuitry can raise an alert.

Decoder block duplication can harden the cryptographic coprocessor against fault injection attacks against the decode logic and/or the control logic once ECC protection on the instruction word has been discarded. A fault injected into one duplicated block becomes apparent or is detectable due to the resulting mismatched control signals that are no longer inverse versions of each other. As the logical implementations of each block can be different, two separate injected faults would be required to alter the control signals without triggering the verification alert.

Eighteenth, compute resources can be duplicated. The cryptographic coprocessor can have duplicated arithmetic units, and circuitry can check that the outputs of both match on each computation. This can form a countermeasure against glitch attacks. Duplicate ALUs can, however, consume significant area and power due to the duplication of the multiply-accumulate (MAC) unit. Alternatively, software can assist with attack detection by instead repeating the more critical computations and checking that the results match.

Nineteenth, instruction flow integrity can be implemented. Instruction flow integrity can ensure that instructions are executed as intended by the software author. Instruction flow integrity includes control flow integrity (CFI) as a special case, but instruction flow integrity also covers instructions within a basic block.

Having generally described schemes, techniques, and hardware for a secure cryptographic coprocessor, this discussion now turns to example methods.

Example Methods for a Secure Cryptographic Coprocessor

Figure 8:
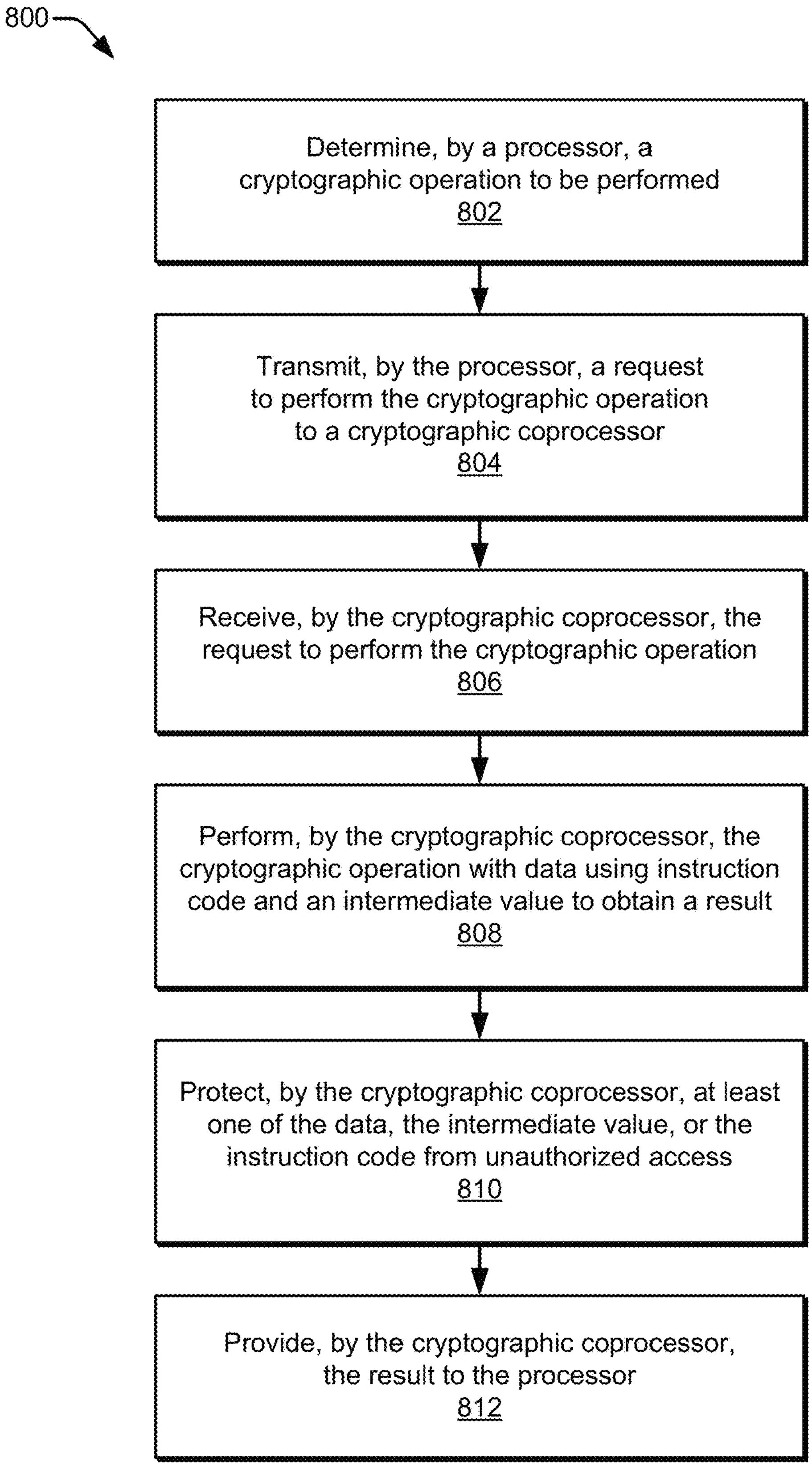
FIG. 8 is a flow diagram illustrating an example process for securing a cryptographic coprocessor.

Example methods are described below with reference to the flow diagrams of FIGS. 8-13. FIG. 8 is a flow diagram 800 illustrating example processes for an apparatus to provide security to a cryptographic coprocessor. The flow diagram 800 includes six blocks 802-812. The acts of the example processes can be performed by security circuitry 106 (e.g., of FIGS. 1 and 2). For example, the acts may be performed by a processor 202 and a cryptographic coprocessor 118 (e.g., of FIGS. 1 and 2).

At block 802, a processor determines a cryptographic operation to be performed. For example, the processor 202 can determine a cryptographic operation 430 to be performed. The cryptographic operation 430 may involve, for instance, a symmetric or an asymmetric cryptographic operation that enables or otherwise supports any of the security-related functions of security circuitry 106 as described herein.

At block 804, the processor transmits a request to perform the cryptographic operation to a cryptographic coprocessor. For example, the processor 202 can transmit a request to perform the cryptographic operation 430 to the cryptographic coprocessor 118. In some cases, the processor 202 may load an instruction code into at least one register that is part of, or otherwise associated with, the cryptographic coprocessor 118. If the cryptographic operation 430 uses an input, the processor 202 may also load one or more inputs into one or more registers. Examples of register-based communication are described herein with reference to FIGS. 3-1 to 3-3. Additionally or alternatively, the processor 202 may drive signaling on an interconnect 110 or a communication pathway dedicated to processor-cryptographic coprocessor communications to transmit the request to perform the cryptographic operation 430.

At block 806, the cryptographic coprocessor receives the request to perform the cryptographic operation. For example, the cryptographic coprocessor 118 can receive the request to perform the cryptographic operation 430. The reception of the request may be implemented with a reception-side operation corresponding to any of the transmission options described above with reference to block 804. For instance, a controller 406 of the cryptographic coprocessor 118 may detect that a new operation code has been loaded into a register.

At block 808, the cryptographic coprocessor performs the cryptographic operation with data using instruction code and an intermediate value to obtain a result. For example, the cryptographic coprocessor 118 can perform the cryptographic operation 430 with data 414 using instruction code 412 and an intermediate value 428 to obtain a result 432. Here, the controller 406 may execute the instruction code 412 based on the data 414, which produces at least one intermediate value 428, while computing the result 432. The result 432 may be a numerical value (e.g., a key) and/or a positive or negative indication.

At block 810, the cryptographic coprocessor protects at least one of the data, the intermediate value, or the instruction code from unauthorized access. For example, the cryptographic coprocessor 118 can protect at least one of the data 414, the intermediate value 428, or the instruction code 412 from unauthorized access. Thus, the cryptographic coprocessor 118 may implement any one or more of the schemes described herein with reference to FIGS. 5 to 7 and/or any one or more of the nineteen (19) techniques described herein, including those set forth above as security-related features in the subsection entitled "Example Schemes, Techniques, and Hardware for a Secure Cryptographic Coprocessor." Example schemes may include securely wiping information (e.g., as described with reference to FIG. 5), utilizing randomized bits having different qualities of randomness via two or more registers to support security-related operations (e.g., as described with reference to FIG. 6), and securing the execution of instruction code with at least one of an instruction count or a checksum generated over the instruction code (e.g., as described with reference to FIG. 7). These schemes and techniques may be used individually or jointly in any combination.

At block 812, the cryptographic coprocessor provides the result to the processor. For example, the cryptographic coprocessor 118 can provide the result 432 to the processor 202. This may be performed by storing the result 432 in a register that is readable to the processor 202, by driving the result 432 onto the interconnect 110 or a dedicated bus, by signaling an affirmative or negative indication, some combination thereof, and so forth.

Figure 9:
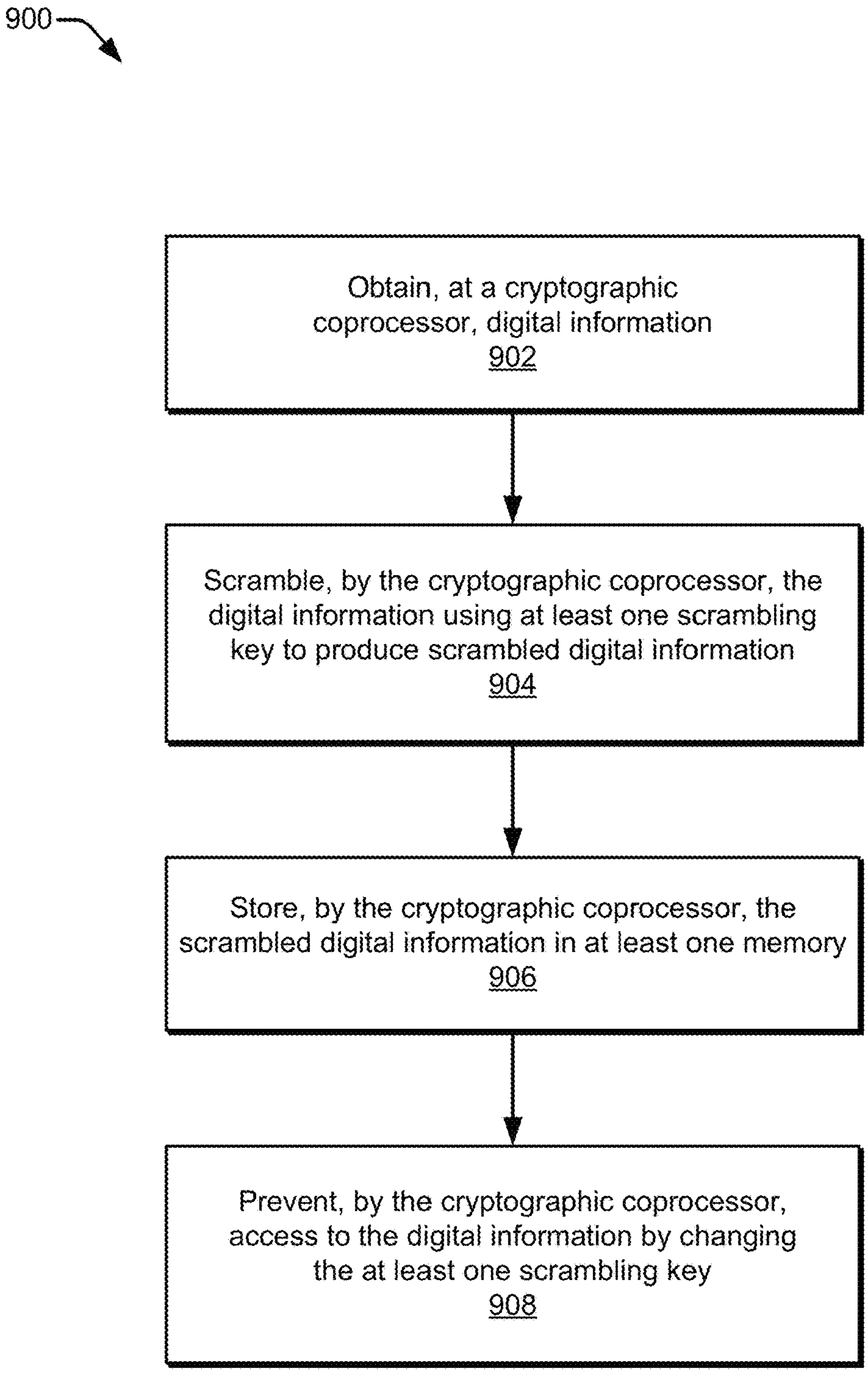
FIG. 9 is a flow diagram illustrating an example process for a cryptographic coprocessor to protect stored state, such as digital information realized as instruction code or data.

FIG. 9 is a flow diagram 900 illustrating example processes for a cryptographic coprocessor to protect stored state, such as digital information. The flow diagram 900 includes four blocks 902-908. The acts of the example processes can be performed by security circuitry 106 (e.g., of FIGS. 1 and 2). For example, the acts may be performed at least partially by a controller 406 (e.g., of FIGS. 4 and 5) of a cryptographic coprocessor 118 (e.g., of FIGS. 1, 2, and 4).

At block 902, a cryptographic coprocessor obtains digital information. For example, the cryptographic coprocessor 118 can obtain digital information by receiving it from another component or by producing it internally. The digital information may include, for instance, instruction code 412, data 414, or at least one intermediate value 428 (or other state information).

At block 904, the cryptographic coprocessor scrambles the digital information using at least one scrambling key to produce scrambled digital information. For example, the cryptographic coprocessor 118 can scramble the digital information using at least one scrambling key 502 or 504 to produce scrambled digital information. Thus, the scrambled digital information may include a scrambled version of the instruction code 412 and/or a scrambled version of the data 414.

At block 906, the cryptographic coprocessor stores the scrambled digital information in at least one memory. For example, the cryptographic coprocessor 118 can store the scrambled digital information in at least one memory, such as an instruction memory 402 or a data memory 404. In some cases, a controller 406 may store the scrambled digital information as it is received or as it is internally produced. In other cases, the controller 406 may read out the digital information from a memory, scramble the digital information to produce the scrambled digital information, and then write the scrambled digital information back to the same memory.

At block 908, the cryptographic coprocessor prevents access to the digital information by changing the at least one scrambling key. For example, the cryptographic coprocessor 118 can prevent access to the digital information (e.g., the instruction code 412 or the data 414) by changing the at least one scrambling key (e.g., a code scrambling key 502 or a data scrambling key 504, respectively). To do so, the controller 406 may replace at least part of a scrambling key with random bits. Although an attacker may still be able to read out the scrambled digital information from the at least one memory, the "original," unscrambled digital information is inaccessible because the scrambling key has been effectively deleted by changing the bits in a register storing the scrambling key.

Figure 10:
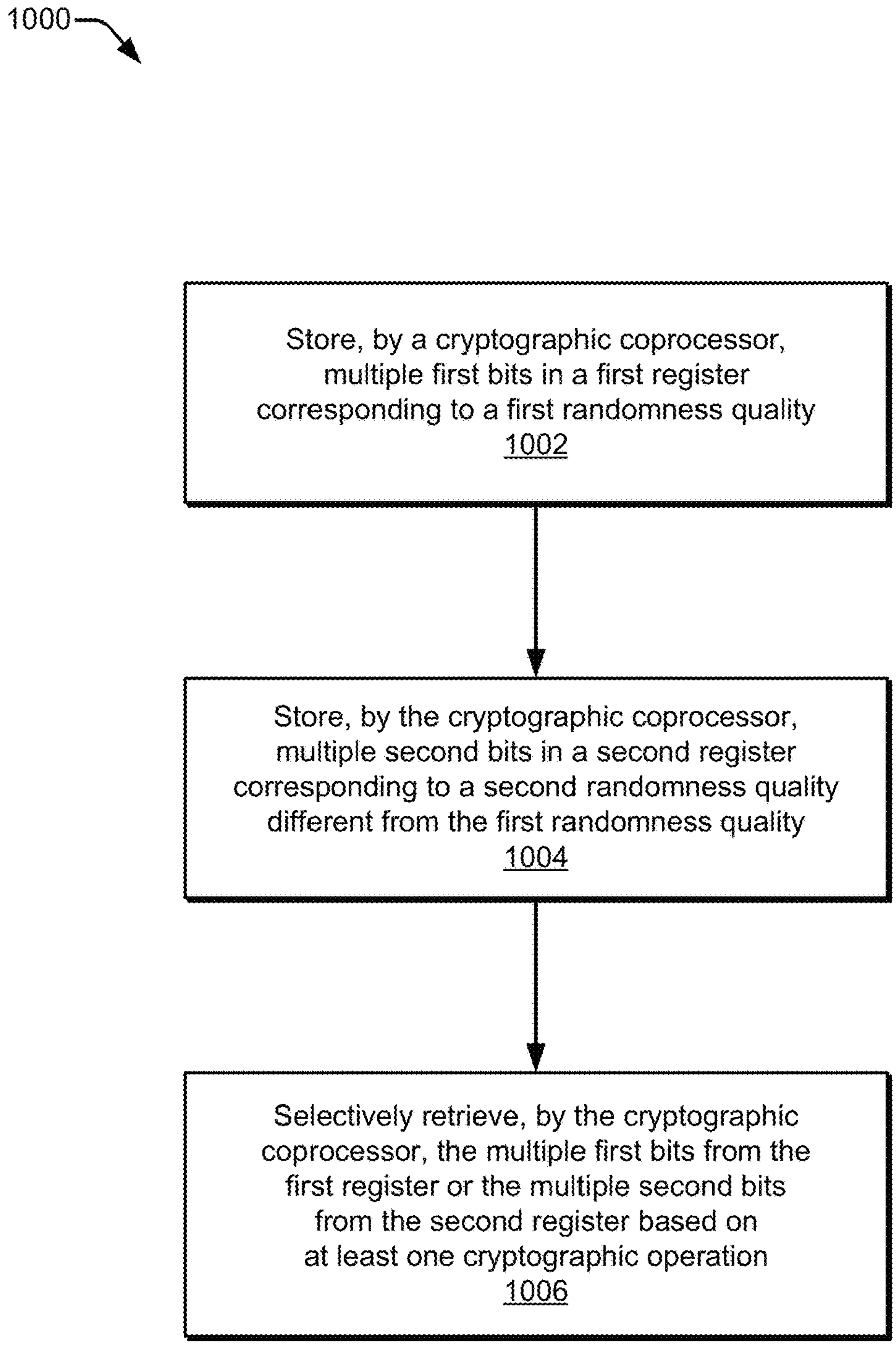
FIG. 10 is a flow diagram illustrating an example process for a cryptographic coprocessor to utilize random values having different levels of randomness quality to efficiently protect the security of associated cryptographic operations.

FIG. 10 is a flow diagram 1000 illustrating example processes for a cryptographic coprocessor to utilize random values having different levels of randomness quality to efficiently protect the security of associated cryptographic operations. The flow diagram 1000 includes three blocks 1002-1006. The acts of the example processes can be performed by security circuitry 106 (e.g., of FIGS. 1 and 2). For example, the acts may be performed at least partially by a controller 406 (e.g., of FIGS. 4 and 6) of a cryptographic coprocessor 118 (e.g., of FIGS. 1, 2, and 4).

At block 1002, a cryptographic coprocessor stores multiple first bits in a first register corresponding to a first randomness quality. For example, the cryptographic coprocessor 118 can store multiple first bits 602-1 in a first register 408-1 corresponding to a first randomness quality 604-1. For instance, a controller 406 may obtain the multiple first bits 602-1 from a non-deterministic source for random numbers and load the multiple first bits 602-1 into the first register 408-1. In some cases, such a source may use an analog-based mechanism in which a random or unpredictable physical property is used to generate the randomized bits for the first register 408-1.

At block 1004, the cryptographic coprocessor stores multiple second bits in a second register corresponding to a second randomness quality different from the first randomness quality. For example, the cryptographic coprocessor 118 can store multiple second bits 602-2 in a second register 408-2 corresponding to a second randomness quality 604-2, which is different from the first randomness quality 604-1. Here, the controller 406 may obtain the multiple second bits 602-2 from a deterministic source for random numbers. In some cases, such a source may use a digital-based mechanism in which a local pseudo-random number generator (PRNG), which may have one or more linear feedback shift registers (LFSRs) for digitally producing additional randomized bits, is used to generate the randomized bits for the second register 408-2.

At block 1006, the cryptographic coprocessor selectively retrieves the multiple first bits from the first register or the multiple second bits from the second register based on at least one cryptographic operation. For example, the cryptographic coprocessor can selectively retrieve the multiple first bits 602-1 from the first register 408-1 or the multiple second bits 602-2 from the second register 408-2 based on at least one cryptographic operation. As described herein, a relatively more sensitive cryptographic operation may be associated with a higher randomness quality (e.g., for asymmetric key generation or meeting a cryptographic standard), and a relatively less sensitive cryptographic operation may be associated with a lower randomness quality. The controller 406 may therefore retrieve randomized bits from a selected register 408 based on the sensitivity of the corresponding cryptographic operation to be performed.

Figure 11:
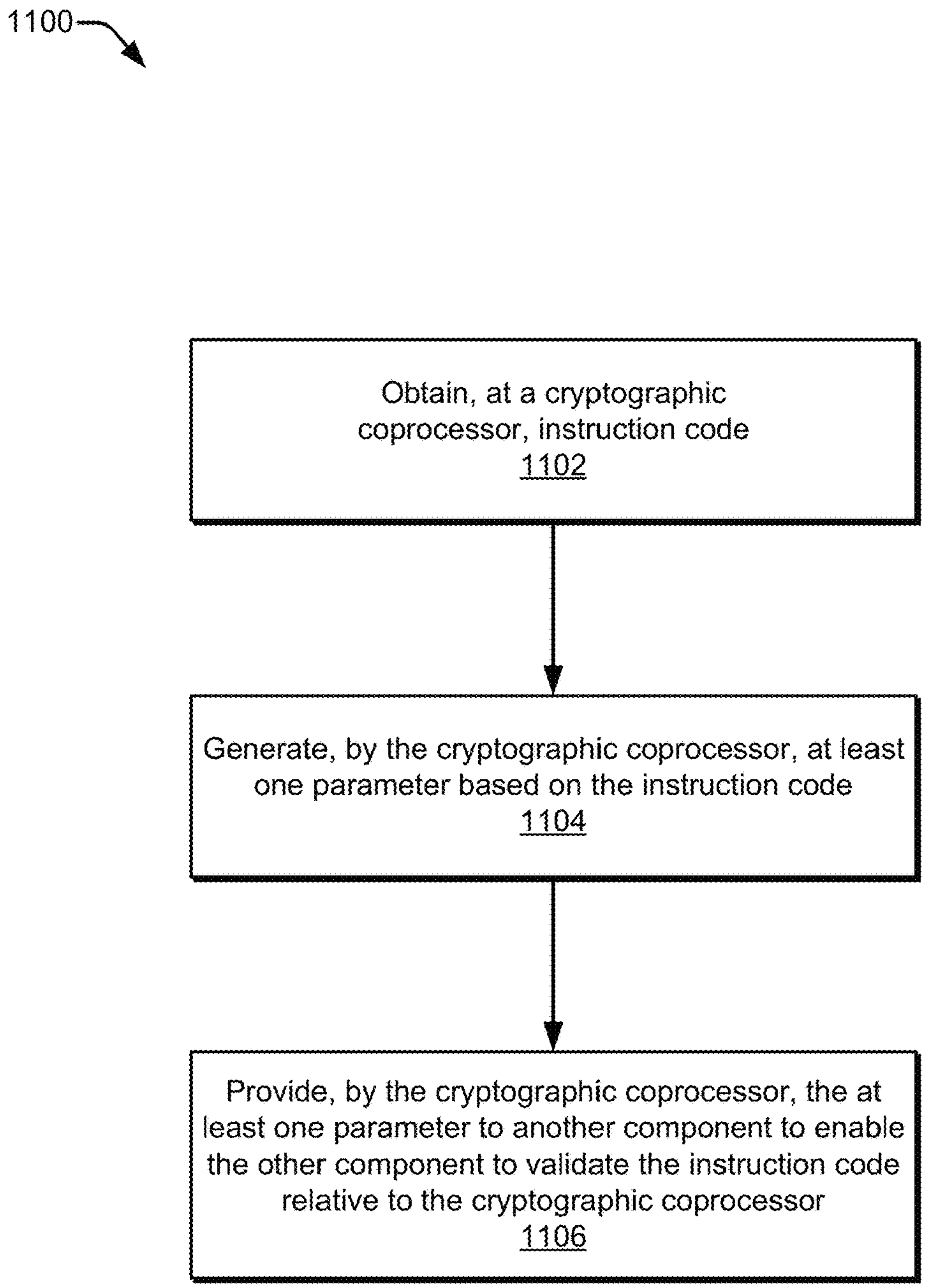
FIG. 11 is a flow diagram illustrating an example process for a cryptographic coprocessor to protect cryptographic operations by enabling validation of instruction code.

FIG. 11 is a flow diagram 1100 illustrating example processes for a cryptographic coprocessor to protect cryptographic operations by enabling validation of instruction code. The flow diagram 1100 includes three blocks 1102-1106. The acts of the example processes can be performed by security circuitry 106 (e.g., of FIGS. 1 and 2). For example, the acts may be performed at least partially by a controller 406 (e.g., of FIGS. 4 and 7) of a cryptographic coprocessor 118 (e.g., of FIGS. 1, 2, and 4).

At block 1102, a cryptographic coprocessor obtains instruction code. For example, the cryptographic coprocessor 118 can obtain instruction code 412. In some cases, the cryptographic coprocessor 118 may receive the instruction code 412 from a host processor 202 via an interconnect 110 or a dedicated pathway in conjunction with a request to perform a cryptographic operation. In other cases, a controller 406 may retrieve the instruction code 412 from a memory, such as an instruction memory 402 of the cryptographic coprocessor 118.

At block 1104, the cryptographic coprocessor generates at least one parameter based on the instruction code. For example, the cryptographic coprocessor 118 can generate at least one parameter (e.g., a numerical value such as an instruction count 706 or a checksum 708) based on the instruction code 412. Example implementations for generating a checksum 708 are described below with reference to FIG. 12, and example implementations for generating an instruction count 706 are described below with reference to FIG. 13.

At block 1106, the cryptographic coprocessor provides the at least one parameter to another component to enable the other component to validate the instruction code relative to the cryptographic coprocessor. For example, the cryptographic coprocessor 118 can provide the at least one parameter to another component (e.g., a processor 202 or another peripheral device 250 if the cryptographic coprocessor 118 is implemented as part of security circuitry 106 as depicted in FIG. 2). By providing the other component access to the at least one parameter, the cryptographic coprocessor 118 can enable the other component to validate the instruction code 412 relative to the cryptographic coprocessor 118. This may be accomplished by the cryptographic coprocessor 118 transmitting the at least one parameter to the other component (e.g., via a shared interconnect or other bus or via a dedicated pathway) or by storing the at least one parameter in at least one register that is exposed to the other component.

The other component, such as the processor 202, may receive or retrieve the at least one parameter and perform a validation operation by comparing the at least one parameter from the cryptographic coprocessor 118 with another value that is determined by the other component or that is obtained by the other component from a source that is separate from the cryptographic coprocessor 118. The validation may be performed relative to the cryptographic coprocessor 118 because, for instance, the at least one parameter is indicative of a nexus between the instruction code 412 and the cryptographic coprocessor 118. The nexus can relate to what instructions are stored as the instruction code 412 in the instruction memory 402 at the cryptographic coprocessor 118, to what instructions of the instruction code 412 are executed by the cryptographic coprocessor 118, and so forth. The validation may include comparing a parameter from the cryptographic coprocessor 118 with another parameter and generating an alert and/or taking another protective action if the two parameter values do not match.

Figure 12:
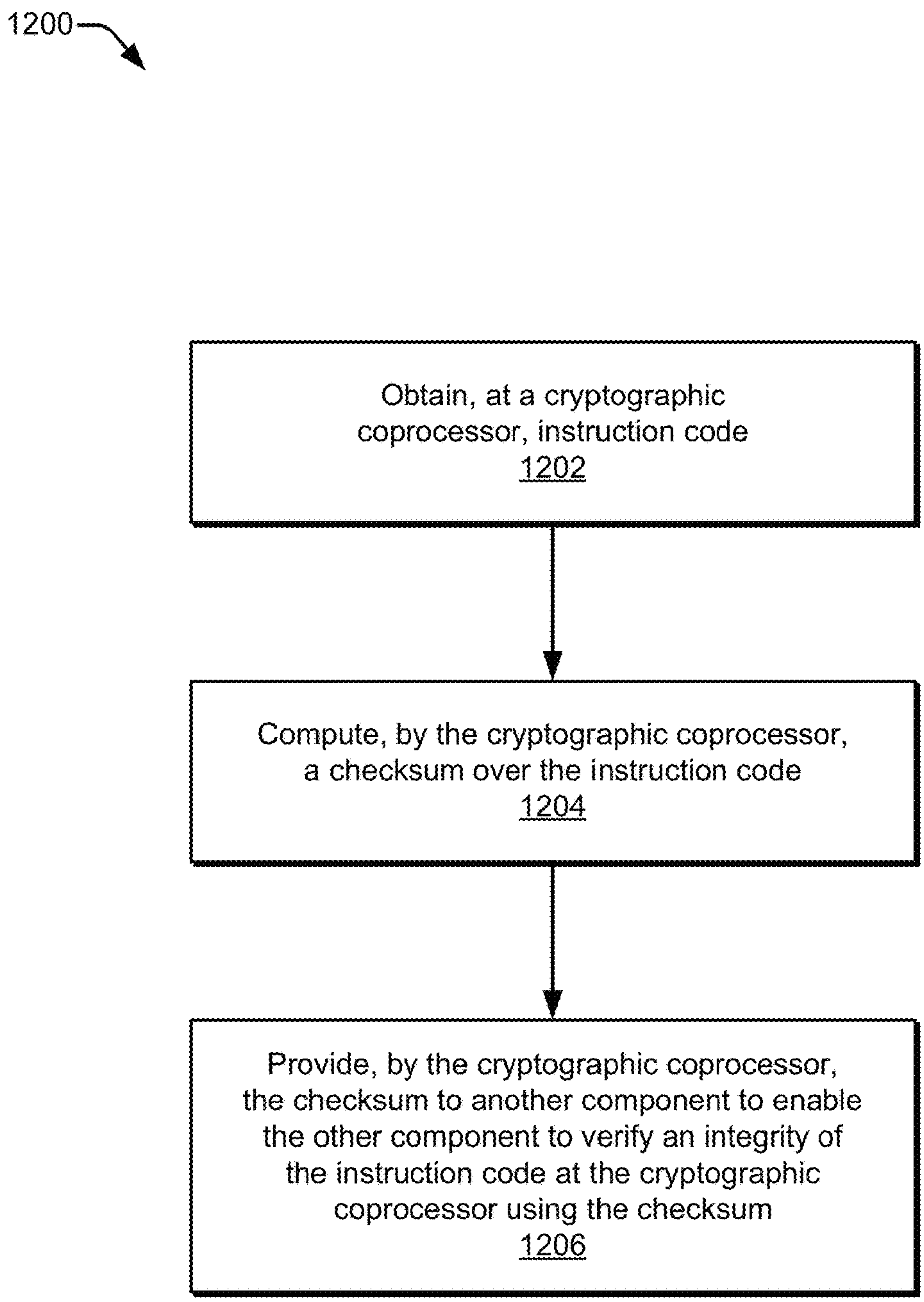
FIG. 12 is a flow diagram illustrating an example process for a cryptographic coprocessor to protect cryptographic operations by enabling integrity verification of instruction code.

FIG. 12 is a flow diagram 1200 illustrating example processes for a cryptographic coprocessor to protect cryptographic operations by enabling integrity verification of instruction code. The flow diagram 1200 includes three blocks 1202-1206. The acts of the example processes can be performed by security circuitry 106 (e.g., of FIGS. 1 and 2). For example, the acts may be performed by a controller 406 (e.g., of FIGS. 4 and 7) of a cryptographic coprocessor 118 (e.g., of FIGS. 1, 2, and 4).

At block 1202, a cryptographic coprocessor obtains instruction code. For example, the cryptographic coprocessor 118 can obtain instruction code 412. Example approaches to obtaining instruction code 412 are described above with reference to block 1102 of FIG. 11.

At block 1204, the cryptographic coprocessor computes a checksum over the instruction code. For example, the cryptographic coprocessor 118 can compute the checksum 708 over the instruction code 412. For instance, the controller 406 may apply a hash function to the instruction code 412 to compute the checksum 708 while receiving the instruction code 412 or by reading the instruction code 412 from the instruction memory 402. The computing may also or instead involve computing a checksum over data 414 stored in a data memory 404. In some of such cases, the computing may produce first and second checksums that respectively correspond to the instruction code 412 and the data 414. In others of such cases, the computing may produce a combined or cumulative checksum that is computed over the data 414 and the instruction code 412 jointly.

At block 1206, the cryptographic coprocessor provides the checksum to another component to enable the other component to verify an integrity of the instruction code at the cryptographic coprocessor using the checksum. For example, the cryptographic coprocessor 118 can provides the checksum 708 to another component (e.g., a processor 202) to enable the other component to verify an integrity of the instruction code 412 located at the cryptographic coprocessor 118 using the checksum 708. Example approaches to providing the checksum 708 to the other component are described above with reference to block 1106 of FIG. 11. To perform the integrity verification, the other component can compare the checksum 708 from the cryptographic coprocessor 118 with a checksum that the other component computed or otherwise obtained independently from the cryptographic coprocessor 118. The provided and compared checksum 708 may relate to the instruction code 412 (separately), the data 414 (separately), or the instruction code 412 and the data 414 (jointly).

Figure 13:
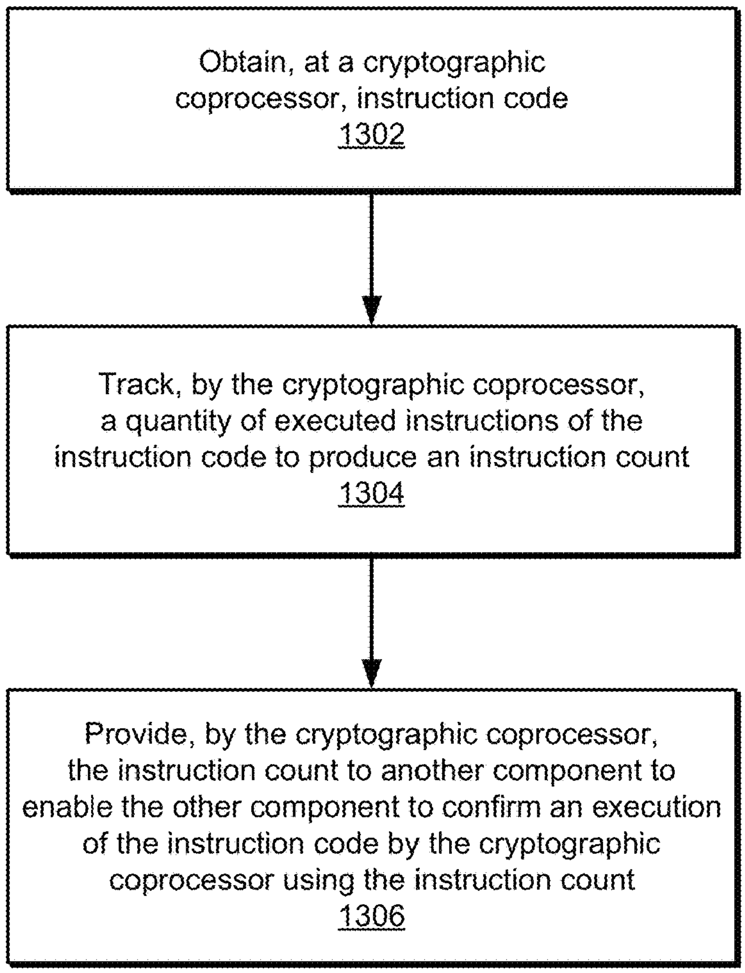
FIG. 13 is a flow diagram illustrating an example process for a cryptographic coprocessor to protect cryptographic operations by enabling execution confirmation of instruction code.

FIG. 13 is a flow diagram 1300 illustrating example processes for a cryptographic coprocessor to protect cryptographic operations by enabling execution confirmation of instruction code. The flow diagram 1300 includes three blocks 1302-1306. The acts of the example processes can be performed by security circuitry 106 (e.g., of FIGS. 1 and 2). For example, the acts may be performed by a controller 406 (e.g., of FIGS. 4 and 7) of a cryptographic coprocessor 118 (e.g., of FIGS. 1, 2, and 4).

At block 1302, a cryptographic coprocessor obtains instruction code. For example, the cryptographic coprocessor 118 can obtain instruction code 412. Example approaches to obtaining instruction code 412 are described above with reference to block 1102 of FIG. 11.

At block 1304, the cryptographic coprocessor tracks a quantity of executed instructions of the instruction code to produce the instruction count. For example, the cryptographic coprocessor 118 can track a quantity of executed instructions of the instruction code 412 to produce the instruction count 706. For instance, the controller 406 may increment a value in an instruction count register 702 responsive to each instruction of the instruction code 412 being executed to perform a requested cryptographic operation.

At block 1306, the cryptographic coprocessor provides the instruction count to another component to enable the other component to confirm an execution of the instruction code by the cryptographic coprocessor using the instruction count. For example, the cryptographic coprocessor 118 can provide the instruction count 706 to another component (e.g., a processor 202) to enable the other component to confirm an execution of the instruction code 412 by the cryptographic coprocessor 118 using the instruction count 706. Example approaches to providing the instruction count 706 to the other component are described above with reference to block 1106 of FIG. 11. To perform the execution confirmation, the other component can compare the instruction count 706 from the cryptographic coprocessor 118 with an instruction count that the other component determines (e.g., has knowledge of) or otherwise obtains independently from the cryptographic coprocessor 118. If the two counts fail to match, the other component can take action, such as invalidating a current cryptographic operation and/or rendering all state in the cryptographic coprocessor 118 unreadable.

Aspects of these methods may be implemented in, for example, hardware (e.g., fixed logic circuitry, a controller, a finite state machine, or a processor in conjunction with a memory), firmware, software, or some combination thereof. The methods may be realized using one or more of the apparatuses or components shown in FIGS. 1 to 7 and 14, which components may be further divided, combined, and so on. The devices and components of these figures generally represent hardware, such as electronic devices, PCBs, packaged modules, IC chips, components, or circuits: firmware: software: or a combination thereof. Thus, these figures illustrate some of the many possible systems or apparatuses capable of implementing the described methods.

For the methods described herein and the associated flow diagram(s), the orders in which operations are shown and/or described are not intended to be construed as a limitation. Instead, any number or combination of the described method operations can be combined in any order to implement a given method or an alternative method, including by combining operations from different flow diagrams into one or more methods. Operations may also be omitted from or added to the described methods. Further, described operations can be implemented in fully or partially overlapping manners.

Example Aspects and Implementations for a Secure Cryptographic Coprocessor

In the following, some example aspects and implementations are described:

Example aspect 1: An apparatus for secure cryptographic coprocessing, the apparatus comprising: an interconnect: a processor coupled to the interconnect, the processor configured to: determine a cryptographic operation to be performed: and transmit a request to perform the cryptographic operation: and a cryptographic coprocessor coupled to the interconnect, the cryptographic coprocessor configured to: receive from the processor the request to perform the cryptographic operation: perform the cryptographic operation with data (e.g., data received by the cryptographic processor, such as from the processor (e.g., as part of the request), or data previously generated in the cryptographic processor) using instruction code (e.g., that is already present in the cryptographic coprocessor when the request is received or that is loaded after and/or responsive to the request) and an intermediate value (which may be a value calculated by the cryptographic processor, e.g., prior to receiving the request and/or as part of processing the request, and may not have previously been output by the cryptographic processor) to obtain a result: protect at least one of the data, the intermediate value, or the instruction code from unauthorized access: and provide the result to the processor.

Example aspect 2: The apparatus of example aspect 1, wherein the cryptographic coprocessor is configured to: protect information stored in at least one memory by changing at least one scrambling key used to scramble the information that is stored in the at least one memory.

Example aspect 3: The apparatus of example aspect 1 or example aspect 2, wherein: the at least one memory comprises a data memory: and the at least one scrambling key comprises a data scrambling key used to scramble the data that is stored in the data memory. This may be at least a part of the protection of the instruction memory specified by example aspect 1.

Example aspect 4: The apparatus of any one of the preceding example aspects, wherein: the at least one memory comprises an instruction memory: and the at least one scrambling key comprises a code scrambling key used to scramble the instruction code that is stored in the instruction memory. This also may be at least a part of the protection of the instruction memory specified by example aspect 1.

Example aspect 5: The apparatus of any one of the preceding example aspects, wherein the cryptographic coprocessor is configured to: protect the intermediate value by overwriting at least one register with random bits, the intermediate value corresponding to state information. This further may be at least a part of the protection of the instruction memory specified by example aspect 1.

Example aspect 6: The apparatus of any one of the preceding example aspects, wherein the cryptographic coprocessor is configured to perform a secure wipe by: overwriting at least one register with random bits: and overwriting the random bits in the at least one register with a constant (e.g., a fixed or static value, such as a zero or non-zero value, including one from a random constant stored in the RTL netlist of the design). This too may be at least a part of the protection referred to by example aspect 1, when the register stores the at least one of the data, the intermediate value, or the instruction code. Thus, the protection of the at least one of the data, the intermediate value, or the instruction code referred to by example aspect 1 may be performed by performing, on the at least one of the data, the intermediate value, or the instruction code, at least one action selected from the group consisting of (i) encoding the at least one of the data, the intermediate value, or the instruction code, such as by generating a scrambling key, and using the generated scrambling key to scramble the at least one of the data, the intermediate value, or the instruction code, stored in the cryptographic coprocessor (e.g., the data, when it is stored in a data memory of the cryptographic coprocessor and/or the instruction code, when it is stored in an instruction memory of the cryptographic processor), or (ii) overwriting the at least one of the data, the intermediate value, or the instruction code.

Example aspect 7: The apparatus of any one of the preceding example aspects, wherein the cryptographic coprocessor comprises: a first register configured to store multiple first bits corresponding to a first quality of randomness: and a second register configured to store multiple second bits corresponding to a second quality of randomness.

Example aspect 8: The apparatus of any one of the preceding example aspects, wherein the cryptographic coprocessor is configured to: selectively retrieve the multiple first bits from the first register or the multiple second bits from the second register based on a quality of randomness (or a "randomness quality") associated with the cryptographic operation.

Example aspect 9: The apparatus of any one of the preceding example aspects, wherein: the first quality of randomness is higher than the second quality of randomness: the multiple first bits correspond to a non-deterministic source for random numbers: and the multiple second bits correspond to a deterministic source for random numbers.

Example aspect 10: The apparatus of any one of the preceding example aspects, wherein the cryptographic coprocessor is configured to: prefetch the multiple first bits into the first register before the multiple first bits are to be used.

Example aspect 11: The apparatus of any one of the preceding example aspects, wherein the cryptographic coprocessor is configured to: generate a checksum over the instruction code associated with an instruction memory: and provide the checksum to the processor.

Example aspect 12: The apparatus of any one of the preceding example aspects, wherein: the cryptographic coprocessor comprises an instruction counter: and the cryptographic coprocessor is configured to: track via the instruction counter a quantity of executed instructions of the instruction code: and provide the quantity of the executed instructions to the processor.

Example aspect 13: The apparatus of any one of the preceding example aspects, wherein: the apparatus comprises a mobile device (e.g., one selected from the group consisting of tablet computers, mobile telephones, and laptop computers); and the mobile device includes an integrated circuit that includes the interconnect, the processor, and the cryptographic coprocessor.

Example aspect 14: A method for an apparatus to provide secure cryptographic coprocessing, the apparatus including a processor coupled to a cryptographic coprocessor via an interconnect, the method comprising: determining, by the processor, a cryptographic operation to be performed: transmitting, by the processor, a request to perform the cryptographic operation to the cryptographic coprocessor: receiving, by the cryptographic coprocessor, the request to perform the cryptographic operation: performing, by the cryptographic coprocessor, the cryptographic operation with data (e.g., data received by the cryptographic processor, such as from the processor (e.g., as part of the request), or data previously generated in the cryptographic processor) using instruction code (e.g., that is already present in the cryptographic coprocessor when the request is received or that is loaded after and/or responsive to the request) and an intermediate value (which may be a value calculated by the cryptographic processor, e.g., prior to receiving the request and/or as part of processing the request, and may not have previously been output by the cryptographic processor) to obtain a result: protecting, by the cryptographic coprocessor, at least one of the data, the intermediate value, or the instruction code from unauthorized access: and providing, by the cryptographic coprocessor, the result to the processor.

Example aspect 15: The method of example aspect 14 or as implemented by any one of the preceding apparatus example aspects, further comprising: protecting, by the cryptographic coprocessor, information stored in at least one memory by changing at least one scrambling key used to scramble the information that is stored in the at least one memory.

Example aspect 16: The method of example aspect 14, example aspect 15, or as implemented by any one of the preceding apparatus example aspects, further comprising: selectively retrieving, by the cryptographic coprocessor, multiple first bits from a first register or multiple second bits from a second register based on a quality of randomness (or a "randomness quality") associated with the cryptographic operation.

Example aspect 17: A method for a cryptographic coprocessor, the method comprising: obtaining, at the cryptographic coprocessor, digital information: scrambling, by the cryptographic coprocessor, the digital information using at least one scrambling key to produce scrambled digital information: storing, by the cryptographic coprocessor, the scrambled digital information in at least one memory: and preventing, by the cryptographic coprocessor, access to the digital information by changing the at least one scrambling key.

Example aspect 18: The method of example aspect 17, wherein: the digital information includes data: the at least one scrambling key includes a data scrambling key: the scrambled digital information includes scrambled data: and the at least one memory includes a data memory.

Example aspect 19: The method of example aspect 17 or example aspect 18, wherein: the digital information includes instruction code: the at least one scrambling key includes a code scrambling key: the scrambled digital information includes scrambled instruction code: and the at least one memory includes an instruction memory.

Example aspect 20: The method of any one of example aspects 17 to 19, wherein: the at least one scrambling key is stored in at least one key register: and the preventing comprises overwriting the at least one key register with random bits.

Example aspect 21: The method of any one of example aspects 17 to 20, further comprising: preventing access to an intermediate value stored in at least one register by overwriting the at least one register with random bits.

Example aspect 22: The method of example aspect 20 or example aspect 21, further comprising: performing a secure wipe by overwriting the random bits in the at least one key register or the at least one register with a constant value.

Example aspect 23: The method of any one of example aspects 17 to 22, wherein: the obtaining comprises receiving the digital information from a host processor: and the host processor and the cryptographic coprocessor comprise at least part of security circuitry for at least one integrated circuit.

Example aspect 24: A method for a cryptographic coprocessor, the method comprising: storing, by the cryptographic coprocessor, multiple first bits in a first register corresponding to a first randomness quality: storing, by the cryptographic coprocessor, multiple second bits in a second register corresponding to a second randomness quality different from the first randomness quality: and selectively retrieving, by the cryptographic coprocessor, the multiple first bits from the first register or the multiple second bits from the second register based on at least one cryptographic operation.

Example aspect 25: The method of example aspect 24, wherein the selectively retrieving comprises: selectively retrieving the multiple first bits from the first register or the multiple second bits from the second register based on a randomness quality associated with the at least one cryptographic operation.

Example aspect 26: The method of example aspect 24 or example aspect 25, wherein: the first randomness quality is higher than the second randomness quality: and the method further comprises: obtaining the multiple first bits from a non-deterministic source for random numbers: and obtaining the multiple second bits from a deterministic source for random numbers.

Example aspect 27: The method of example aspect 26, wherein: the non-deterministic source for random numbers comprises an analog-based source: and the deterministic source for random numbers comprises a digital-based source including a pseudo-random number generator.

Example aspect 28: The method of any one of example aspects 24 to 27, further comprising: prefetching the multiple first bits into the first register before the multiple first bits are to be used.

Example aspect 29: A method for a cryptographic coprocessor, the method comprising: obtaining, at the cryptographic coprocessor, instruction code: generating, by the cryptographic coprocessor, at least one parameter based on the instruction code: and providing, by the cryptographic coprocessor, the at least one parameter to another component to enable the other component to validate the instruction code relative to the cryptographic coprocessor.

Example aspect 30: The method of example aspect 29, wherein: the at least one parameter includes a checksum: the generating comprises computing the checksum over the instruction code: and the providing comprises providing the checksum to the other component to enable the other component to verify an integrity of the instruction code at the cryptographic coprocessor using the checksum. The generating may also (or instead) comprise computing a checksum over data stored in a data memory. Accordingly, the generating may produce first and second checksums that respectively correspond to the instruction code and the data, or the generating may produce a combined or cumulative checksum that is computed over the data and the instruction code jointly.

Example aspect 31: The method of example aspect 29 or example aspect 30, wherein: the at least one parameter includes an instruction count: the generating comprises tracking a quantity of executed instructions of the instruction code to produce the instruction count: and the providing comprises providing the instruction count to the other component to enable the other component to confirm an execution of the instruction code by the cryptographic coprocessor using the instruction count.

Example aspect 32: The method of any one of example aspects 29 to 31, wherein: the providing comprises exposing the at least one parameter in a register accessible by the other component, the other component comprising a host processor: and the host processor and the cryptographic coprocessor comprise at least part of security circuitry of an integrated circuit.

Example aspect 33: An apparatus comprising: a cryptographic coprocessor configured to perform the method of any one of example aspects 17 to 32.

Example Electronic Devices for a Secure Cryptographic Coprocessor

Figure 14:
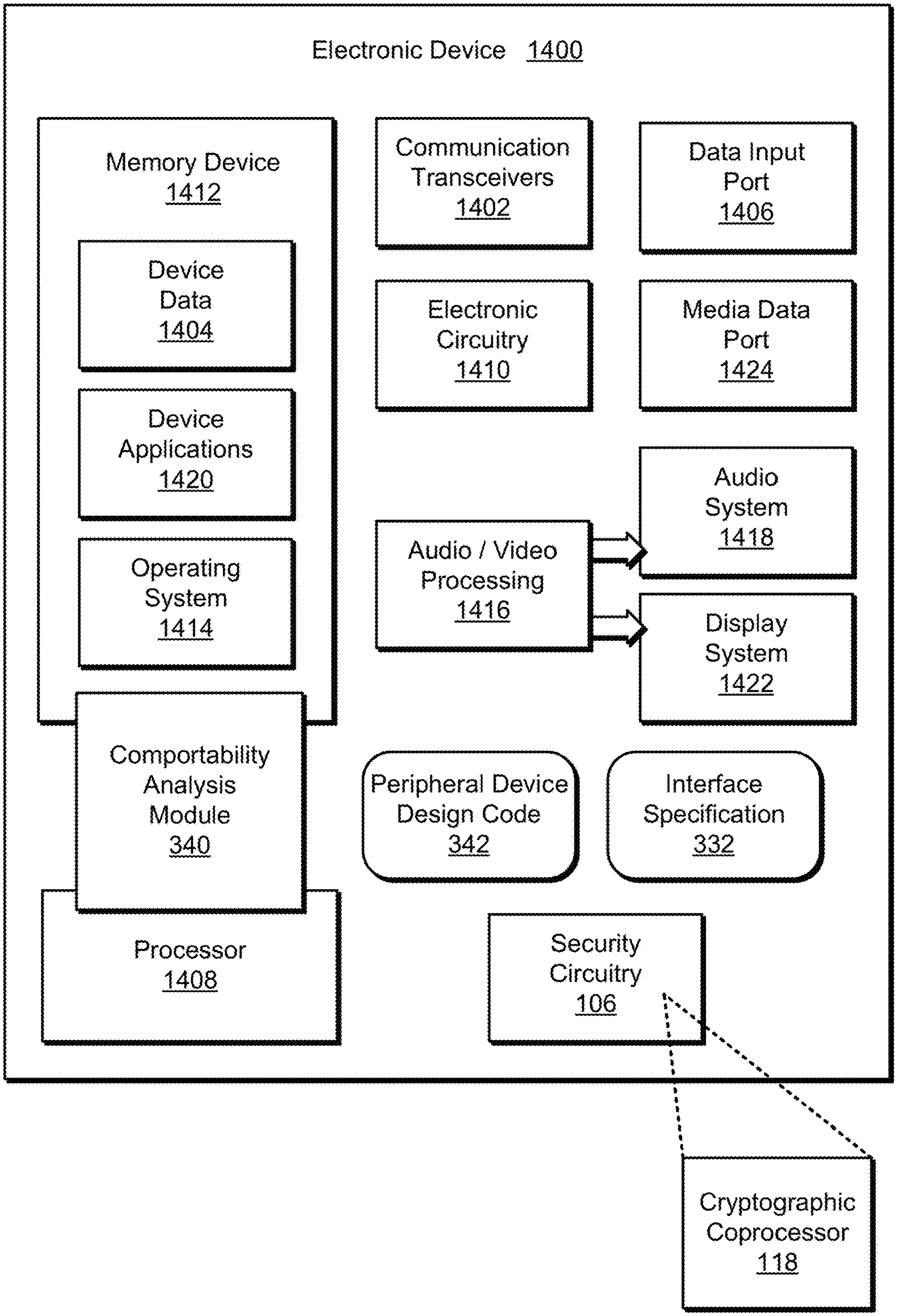
FIG. 14 illustrates various components of an example electronic device that can implement a secure cryptographic coprocessor in accordance with one or more described aspects.

FIG. 14 illustrates various components of an example electronic device 1400 that can implement a secure cryptographic coprocessor 118 in accordance with one or more described aspects. The electronic device 1400 may be implemented as any one or combination of a fixed, mobile, stand-alone, or embedded device: in any form of a consumer, computer, portable, user, server, communication, phone, navigation, gaming, audio, camera, messaging, media playback, and/or other type of electronic device 1400, such as the smartphone that is depicted in FIG. 1 as the apparatus 102. One or more of the illustrated components may be realized as discrete components or as integrated components on at least one integrated circuit of the electronic device 1400.

The electronic device 1400 can include one or more communication transceivers 1402 that enable wired and/or wireless communication of device data 1404, such as received data, transmitted data, or other information identified above. Example communication transceivers 1402 include near-field communication (NFC) transceivers, wireless personal area network (PAN) (WPAN) radios compliant with various IEEE 802.15 (Bluetooth™) standards, wireless local area network (LAN) (WLAN) radios compliant with any of the various IEEE 802.11 (Wi-Fi™) standards, wireless wide area network (WAN) (WWAN) radios (e.g., those that are 3GPP-compliant) for cellular telephony, wireless metropolitan area network (MAN) (WMAN) radios compliant with various IEEE 802.16 (WiMAX™) standards, infrared (IR) transceivers compliant with an Infrared Data Association (IrDA) protocol, and wired local area network (LAN) (WLAN) Ethernet transceivers.

The electronic device 1400 may also include one or more data input ports 1406 via which any type of data, media content, and/or other inputs can be received, such as user-selectable inputs, messages, applications, music, television content, recorded video content, and any other type of audio, video, and/or image data received from any content and/or data source, including a sensor like a microphone or a camera. The data input ports 1406 may include USB ports, coaxial cable ports, fiber optic ports for optical fiber interconnects or cabling, and other serial or parallel connectors (including internal connectors) for flash memory, DVDs, CDs, and the like. These data input ports 1406 may be used to couple the electronic device to components, peripherals, or accessories such as keyboards, microphones, cameras, or other sensors.

The electronic device 1400 of this example includes at least one processor 1408 (e.g., any one or more of application processors, microprocessors, digital-signal processors (DSPs), controllers, and the like), which can include a combined processor and memory system (e.g., implemented as part of an SoC), that processes (e.g., executes) computer-executable instructions to control operation of the device. The processor 1408 may be implemented as an application processor, embedded controller, microcontroller, security processor, artificial intelligence (AI) accelerator, and the like. Generally, a processor or processing system may be implemented at least partially in hardware, which can include components of an integrated circuit or on-chip system, a digital-signal processor (DSP), an application-specific integrated circuit (ASIC), a field-programmable gate array (FPGA), a complex programmable logic device (CPLD), and other implementations in silicon and/or other materials.

Alternatively or additionally, the electronic device 1400 can be implemented with any one or combination of electronic circuitry, which may include software, hardware, firmware, or fixed logic circuitry that is implemented in connection with processing and control circuits, which are generally indicated at 1410 (as electronic circuitry 1410). This electronic circuitry 1410 can implement executable or hardware-based modules (not shown in FIG. 14), such as through processing/computer-executable instructions stored on computer-readable media, through logic circuitry and/or hardware (e.g., such as an FPGA), and so forth.

Although not shown, the electronic device 1400 can include a system bus, interconnect, crossbar, data transfer system, or other switch fabric that couples the various components within the device. A system bus or interconnect can include any one or a combination of different bus structures, such as a memory bus or memory controller, a peripheral bus, a universal serial bus, and/or a processor or local bus that utilizes any of a variety of bus architectures.

The electronic device 1400 also includes one or more memory devices 1412 that enable data storage, examples of which include random access memory (RAM), non-volatile memory (e.g., read-only memory (ROM), flash memory, EPROM, and EEPROM), and a disk storage device. Thus, the memory device(s) 1412 can be distributed across different logical storage levels of a system as well as at different physical components. The memory device(s) 1412 provide data storage mechanisms to store the device data 1404, other types of code and/or data, and various device applications 1420 (e.g., software applications or programs). For example, an operating system 1414 can be maintained as software instructions within the memory device 1412 and executed by the processor 1408.

In some implementations, the electronic device 1400 also includes an audio and/or video processing system 1416 that processes audio data and/or passes through the audio and video data to an audio system 1418 and/or to a display system 1422 (e.g., a video buffer or a screen of a smartphone or camera). The audio system 1418 and/or the display system 1422 may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, video bus, or other similar communication link, such as a media data port 1424. In some implementations, the audio system 1418 and/or the display system 1422 are external or separate components of the electronic device 1400. Alternatively, the display system 1422, for example, can be an integrated component of the example electronic device 1400, such as part of an integrated touch interface.

The electronic device 1400 of FIG. 14 is an example implementation of the apparatus 102 of FIG. 1, an example implementation of a device that can implement the analysis 344 of FIG. 3-2, and an example implementation of a device that can implement a method of FIG. 8. The electronic device 1400 can thus include security circuitry 106, which can be a separate IC chip or included as part of another IC chip or device, like the processor 1408, the electronic circuitry 1410, or the memory device 1412. Accordingly, one or more of the illustrated components may be integrated on the same IC chip, like an SoC, or at least on a single PCB. Further, a peripheral device 250 (e.g., of FIG. 2) may be able to communicate with the processor 202 of the security circuitry 106 and/or with the processor 1408, which may be separate from the security circuitry 106.

As shown, the electronic device 1400 may additionally or alternatively include a comportability analysis module 340. For instance, the memory device 1412 may store the comportability analysis module 340, and the processor 1408 may execute the comportability analysis module 340. Accordingly, the memory device 1412 may also store peripheral device design code 342, an interface specification 332, and so forth. The electronic device 1400 may also or instead implement the process of FIG. 8. Moreover, the cryptographic coprocessor 118 can include any of the components of FIGS. 4 to 7—e.g., as part of the security circuitry 106. Further, the cryptographic coprocessor 118 can be implemented in any of the components of the electronic device 1400 that are described above, as part of or separate from the security circuitry 106. For instance, the processor 1408 may operate as a host processor that is supported by the cryptographic coprocessor 118. The principles of a secure cryptographic coprocessor as described herein can therefore be implemented by, or in conjunction with, the electronic device 1400 of FIG. 14.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A." as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description. Although implementations for a secure cryptographic coprocessor have been described in language specific to certain features and/or methods, the subject of the appended claims is not necessarily limited to the specific features or methods described. Rather, the specific features and methods are disclosed as example implementations for a secure cryptographic coprocessor and/or secure cryptographic coprocessing.

What is claimed is:

1. A method for a cryptographic coprocessor, the method comprising:

obtaining, at the cryptographic coprocessor, digital information;

scrambling, by the cryptographic coprocessor, the digital information using at least one scrambling key to produce scrambled digital information, the at least one scrambling key stored in at least one key register;

storing, by the cryptographic coprocessor, the scrambled digital information in at least one memory;

preventing, by the cryptographic coprocessor, access to the digital information by changing the at least one scrambling key, including overwriting the at least one key register with random bits; and performing, by the cryptographic coprocessor, a secure wipe by overwriting the random bits in the at least one key register with a constant value.

2. The method of claim 1, wherein:

the digital information includes data;

the at least one scrambling key includes a data scrambling key;

the scrambled digital information includes scrambled data; and the at least one memory includes a data memory.

3. The method of claim 1, wherein:

the digital information includes instruction code;

the at least one scrambling key includes a code scrambling key;

the scrambled digital information includes scrambled instruction code; and the at least one memory includes an instruction memory.

4. The method of claim 1, further comprising:

preventing access to an intermediate value stored in at least one register by overwriting the at least one register with random bits.

5. The method of claim 4, further comprising:

performing another secure wipe by overwriting the random bits in the at least one register with a constant value.

6. The method of claim 1, wherein:

the obtaining comprises receiving the digital information from a host processor; and the host processor and the cryptographic coprocessor comprise at least part of security circuitry for at least one integrated circuit.

7. The method of claim 1, further comprising:

storing, by the cryptographic coprocessor, multiple first bits in a first register corresponding to a first randomness quality;

storing, by the cryptographic coprocessor, multiple second bits in a second register corresponding to a second randomness quality different from the first randomness quality; and selectively retrieving, by the cryptographic coprocessor, the multiple first bits from the first register or the multiple second bits from the second register based on at least one cryptographic operation.

8. The method of claim 7, wherein the selectively retrieving comprises:

selectively retrieving the multiple first bits from the first register or the multiple second bits from the second register based on a randomness quality associated with the at least one cryptographic operation.

9. The method of claim 7, wherein:

the first randomness quality is higher than the second randomness quality; and the method further comprises:

obtaining the multiple first bits from a non-deterministic source for random numbers; and obtaining the multiple second bits from a deterministic source for random numbers.

10. The method of claim 9, wherein:

the non-deterministic source for random numbers comprises an analog-based source; and the deterministic source for random numbers comprises a digital-based source including a pseudo-random number generator.

11. The method of claim 7, further comprising:

prefetching the multiple first bits into the first register before the multiple first bits are to be used.

12. The method of claim 1, further comprising:

obtaining, at the cryptographic coprocessor, instruction code;

generating, by the cryptographic coprocessor, at least one parameter based on the instruction code; and providing, by the cryptographic coprocessor, the at least one parameter to another component to enable the other component to validate the instruction code relative to the cryptographic coprocessor.

13. The method of claim 12, wherein:

the at least one parameter includes a checksum;

the generating comprises computing the checksum over the instruction code; and the providing comprises providing the checksum to the other component to enable the other component to verify an integrity of the instruction code at the cryptographic coprocessor using the checksum.

14. The method of claim 12, wherein:

the at least one parameter includes an instruction count;

the generating comprises tracking a quantity of executed instructions of the instruction code to produce the instruction count; and the providing comprises providing the instruction count to the other component to enable the other component to confirm an execution of the instruction code by the cryptographic coprocessor using the instruction count.

15. The method of claim 12, wherein:

the providing comprises exposing the at least one parameter in a register accessible by the other component, the other component comprising a host processor; and the host processor and the cryptographic coprocessor comprise at least part of security circuitry of an integrated circuit.

16. The method of claim 15, further comprising:

determining, by the host processor, at least one other parameter; and comparing, by the host processor, the at least one other parameter to the at least one parameter that is exposed by the register.

17. The method of claim 12, further comprising:

computing, by the cryptographic coprocessor, a checksum over data stored in a data memory of the cryptographic coprocessor; and providing, by the cryptographic coprocessor, the checksum to the other component to enable the other component to verify an integrity of the data stored in the data memory of the cryptographic coprocessor using the checksum.

18. The method of claim 12, further comprising:

storing, by the cryptographic coprocessor, multiple first bits in a first register corresponding to a first randomness quality;

storing, by the cryptographic coprocessor, multiple second bits in a second register corresponding to a second randomness quality different from the first randomness quality; and selectively retrieving, by the cryptographic coprocessor, the multiple first bits from the first register or the multiple second bits from the second register based on at least one cryptographic operation.

19. An apparatus comprising:

a cryptographic hardware coprocessor, the cryptographic hardware coprocessor configured to:

obtain digital information;

scramble the digital information using at least one scrambling key to produce scrambled digital information, the at least one scrambling key stored in at least one key register;

store the scrambled digital information in at least one memory;

prevent access to the digital information by changing the at least one scrambling key, the cryptographic hardware coprocessor configured to change the at least one scrambling key by overwriting the at least one key register with random bits; and perform a secure wipe by overwriting the random bits in the at least one key register with a constant value.

* * * * *